United States Patent [19]
Kaneko et al.

[11] Patent Number: 5,745,297
[45] Date of Patent: Apr. 28, 1998

[54] RETROFOCUS LENS SYSTEM

[75] Inventors: Toshihide Kaneko; Shinsuke Shikama; Eiichi Toide, all of Tokyo, Japan

[73] Assignee: Mitsubishi Denki Kabushiki Kaisha, Tokyo, Japan

[21] Appl. No.: 678,691

[22] Filed: Jul. 11, 1996

[30] Foreign Application Priority Data

Jul. 13, 1995 [JP] Japan ................................. 7-177570

[51] Int. Cl.$^6$ ............................... G02B 3/00; G02B 13/04
[52] U.S. Cl. ............................................. 359/651; 359/753
[58] Field of Search ............................. 359/651, 749–753

[56] References Cited

U.S. PATENT DOCUMENTS

| | | | |
|---|---|---|---|
| 5,042,929 | 8/1991 | Tanaka et al. | 359/752 |
| 5,278,698 | 1/1994 | Iizuka et al. | 359/753 |
| 5,442,484 | 8/1995 | Shikama | 359/651 |

FOREIGN PATENT DOCUMENTS 5-150158  6/1993  Japan.
5-150159  6/1993  Japan.

Primary Examiner—Georgia Y. Epps
Assistant Examiner—Evelyn A. Lester

[57] ABSTRACT

A retrofocus lens system comprises, in order from a large conjugate side: a first lens group having a negative refracting power and including a plurality of lens elements; a second lens group having a positive refracting power; and a third lens group having a positive refracting power. Each of the lens elements of the first lens group has a negative refracting power. Following conditional expressions (1) to (3) are satisfied:

$$1.3 < D_1/f < 1.8 \quad (1)$$

$$0.7 < f_2/f_3 < 1.1 \quad (2)$$

$$1.1 < |f_1|/f < 1.6 \quad (3)$$

where $D_1$ is air gap between the first lens group and the second lens group, $f_1$ is a focal length of the first lens group, $f_2$ is a focal length of the second lens group, $f_3$ is a focal length of the third lens group, and f is a focal length of whole lens system including the first to third lens groups.

14 Claims, 21 Drawing Sheets

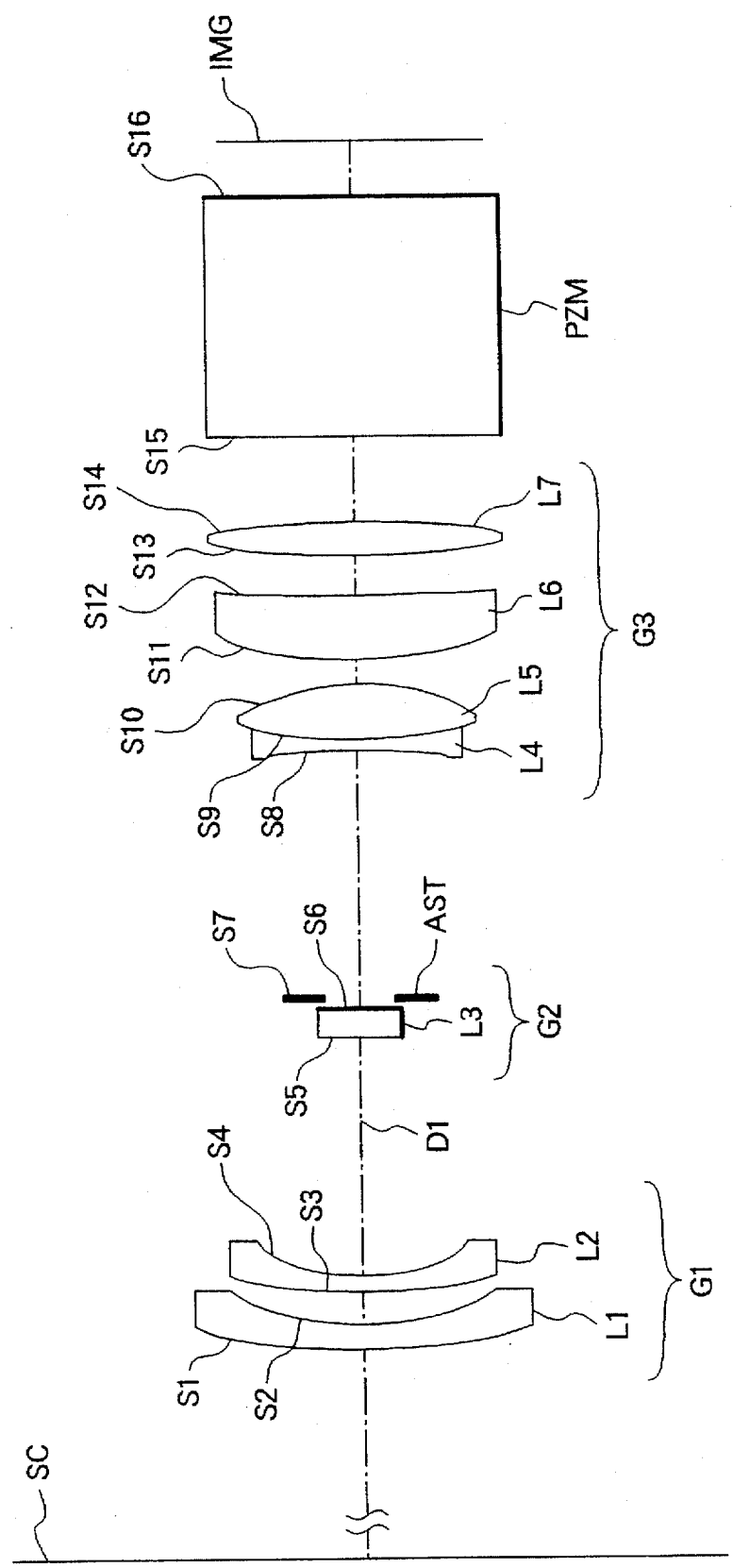

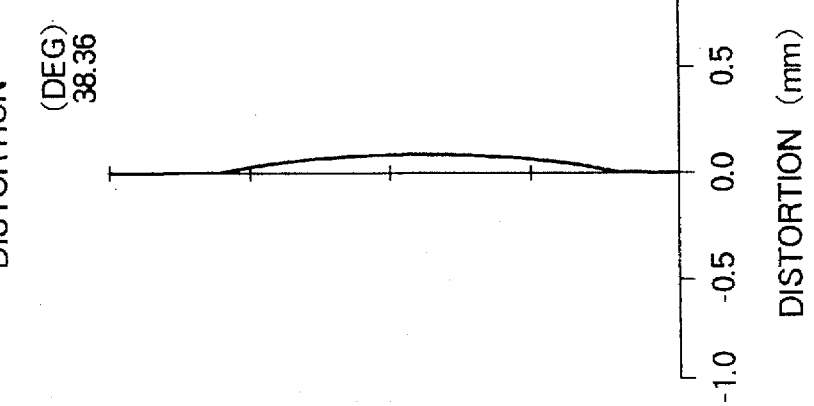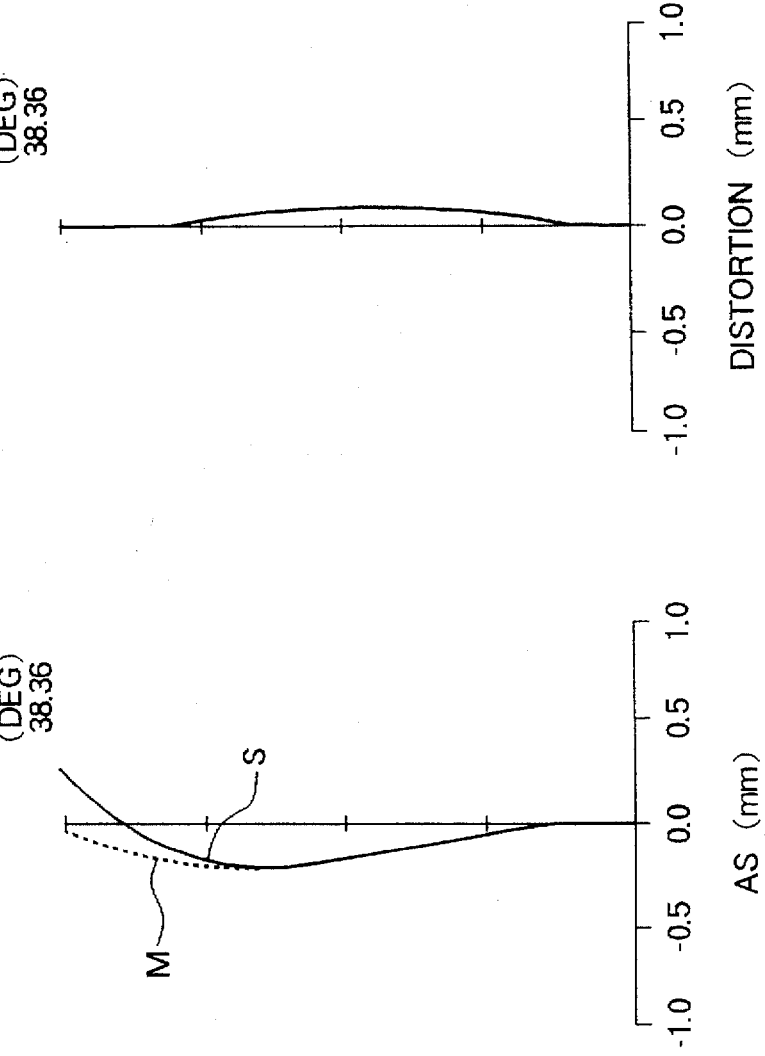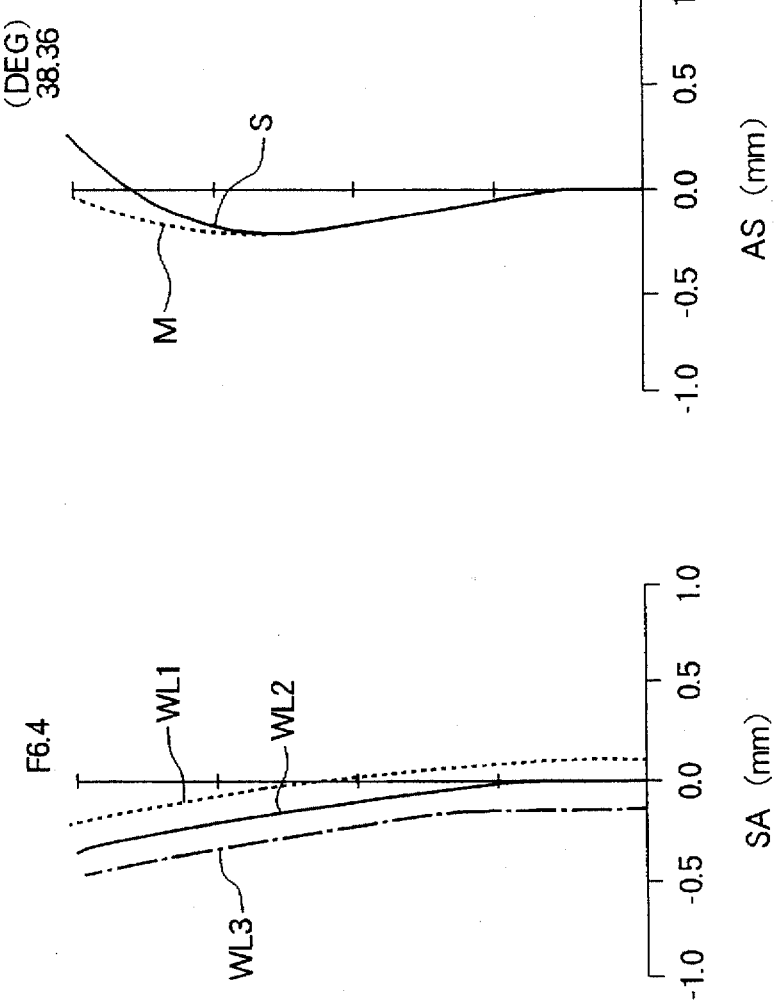

RETROFOCUS LENS SYSTEM

BACKGROUND OF THE INVENTION

The present invention relates to a retrofocus lens system that must have a long back focal length, and particularly relates to a retrofocus lens system built in, for example, a projection-type display apparatus having a liquid-crystal display element as an image source.

FIG. 20 is a schematic diagram showing an optical system contained in a box 201 of a conventional liquid-crystal projector 300. As shown in FIG. 20, a light beam 2 is emitted from a light source 1 consisting of a lamp 120 and a reflecting concave mirror 130. The light beam 2 is then split into three primary colors, red, green and blue, by a dichroic mirror 3B that transmits green and red light but reflects blue light, and a dichroic mirror 3G that reflects green light but transmits red light. The red light is deflected by the mirrors 4a and 4c so as to irradiate a liquid-crystal panel 5R, the blue light is deflected by the mirror 4b so as to irradiate a liquid-crystal panel 5B, and the green light irradiates a liquid-crystal panel 5G. The light beams modulated by the images displayed on the liquid-crystal panels 5R, 5G and 5B are synthesized by a dichroic prism 6. The synthesized light beam impinges on a projection lens 7, and is magnified and projected on the screen.

However, the liquid-crystal projector 300 must have a long back focal length for inserting the dichroic prism 6 between the projection lens 7 and the liquid-crystal panels 5R, 5G, 5B as image sources.

Further, when the liquid-crystal projector 300 is built in the rear projection-type display apparatus, it is difficult to make a size of the apparatus small. Furthermore, in order to make the size of the apparatus small, the projection lens having a wide field angle is required.

Further, since the dichroic prism 6 disposed between the projection lens 7 and the liquid-crystal panels 5R, 5G, 5B changes its transmittance and reflectivity characteristic in accordance with an incident angle of the incident light beam, the optical system is designed to make the light beam 2 parallel. The light beam impinging on the projection lens 7 is therefore parallel beam. When using the conventional projection lens 7, the light amount from the peripheral part of the image source is excessively reduced and the peripheral part of projected image becomes dark. In order to prevent this problem, it is desirable that the projection lens system has telecentric characteristics, which means that principal light beam impinging on the projection lens 7 from each point of the liquid-crystal panels 5R, 5G, 5B is practically parallel to the optical axis.

SUMMARY OF THE INVENTION

It is therefore an object of the present invention to provide a retrofocus lens system which is telecentric on an image source side and has a long back focal length in comparison with a focal length.

According to one aspect of the present invention, a retrofocus lens system comprises, in order from a large conjugate side: a first lens group having a negative refracting power and including a plurality of lens elements; a second lens group having a positive refracting power; and a third lens group having a positive refracting power. Each of the lens elements of the first lens group has a negative refracting power.

Further, the first lens group includes, in order from the large conjugate side, a first lens element having a negative refracting power and a second lens element having a negative refracting power; the second lens group includes, in order from the large conjugate side, a third lens element having a positive refracting power; and the third lens group includes, in order from the large conjugate side, a fourth lens element having a negative refracting power, a fifth lens element bonded to the fourth lens element and having a negative refracting power, sixth lens element having a positive refracting power and a seventh lens element having a positive refracting power.

It is desirable that following conditional expressions (1) to (3) are satisfied:

$$1.3 < D_1/f < 1.8 \tag{1}$$

$$0.7 < f_2/f_3 < 1.1 \tag{2}$$

$$1.1 < |f_1|/f < 1.6 \tag{3}$$

where $D_1$ is an air gap between the first lens group and the second lens group, $f_1$ is a focal length of the first lens group, $f_2$ is a focal length of the second lens group, $f_3$ is a focal length of the third lens group, and f is a focal length of whole lens system including the first to third lens groups.

Also, at least one surface of the first lens element is aspherical, and at least one surface of the seventh lens element is aspherical.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a cross sectional view showing a retrofocus lens system according to a first embodiment of the present invention;

FIGS. 11A, 11B and 11C show characteristic curves of spherical aberration, astigmatism and distortion of the retrofocus lens system according to the fourth embodiment;

DETAILED DESCRIPTION OF THE INVENTION

Preferred embodiments of the retrofocus lens system of the present invention will now be described with reference to the appended drawings.

First Embodiment

FIG. 1 is a cross sectional view showing a retrofocus lens system according to a first embodiment of the present invention. As shown in FIG. 1, the retrofocus lens system of the first embodiment comprises a first lens group $G_1$ disposed on a large conjugate side which is the side of the screen SC and having a negative refracting power, a second lens group $G_2$ having a positive refracting power, and a third lens group $G_3$ disposed on a small conjugate side which is the side of the liquid-crystal panel IMG and having a positive refracting power.

The first lens group $G_1$ includes, in order from the large conjugate side, an aspherical first lens element $L_1$ having a negative refracting power and a second lens element $L_2$ having a negative refracting power.

The second lens group $G_2$ includes a third lens element $L_3$ having a positive refracting power. The aperture stop AST is provided in the vicinity of the third lens element $L_5$ on the small conjugate side. The aperture stop AST has an aperture (not shown in the figures), a diameter of which can be changed.

The third lens group $G_3$ includes, in order from the large conjugate side, a biconcave fourth lens element $L_4$ having a negative refracting power and a biconvex fifth lens element $L_5$ having a positive refracting power. As shown as a surface $S_9$ in FIG. 1, the concave surface on the small conjugate side of the fourth lens element $L_4$ is in contact with the convex surface on the large conjugate side of the fifth lens element $L_5$. The third lens group $G_3$ also includes, in order from the large conjugate side, a sixth lens element $L_6$ having a positive refracting power and an aspherical seventh lens element $L_7$ having a positive refracting power.

The retrofocus lens system according to the first embodiment satisfies following conditional expressions (1) to (3):

$$1.3 < D_1/f < 1.8 \quad (1)$$

$$0.7 < f_2/f_3 < 1.1 \quad (2)$$

$$1.1 < |f_1|/f < 1.6 \quad (3)$$

where a symbol $D_1$ is an air gap (or distance) between the first lens group $G_1$ and the second lens group $G_2$ (i.e., between the second lens element $L_2$ and the third lens element $L_3$), a symbol $f_1$ is a focal length of the first lens group $G_1$, a symbol $f_2$ is a focal length of the second lens group $G_2$, a symbol $f_3$ is a focal length of the third lens group $G_3$, and a symbol $f$ is a focal length of the whole lens system including the first to third lens groups $G_1$ to $G_3$.

Figure 16:
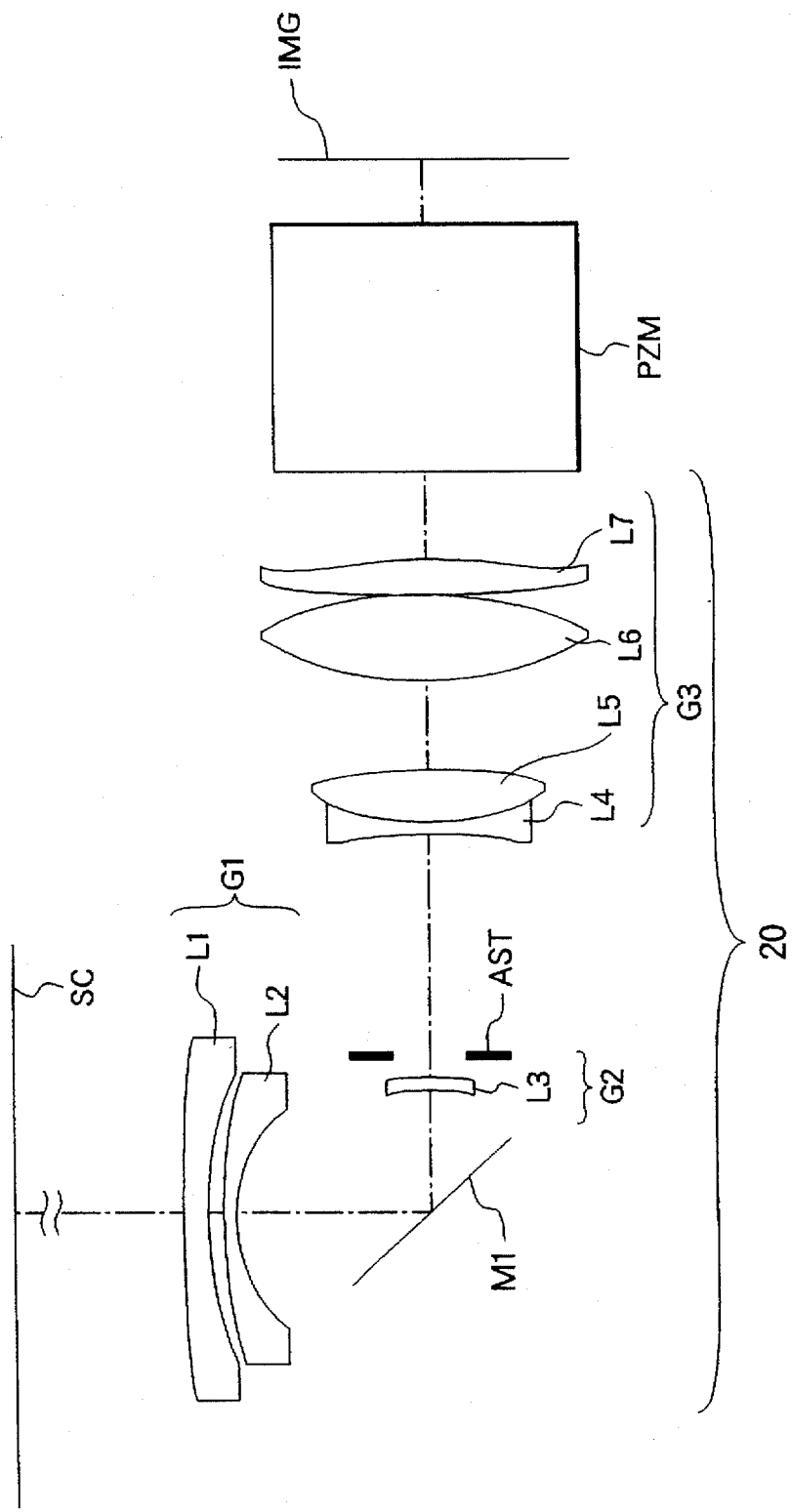
FIG. 16 is a cross sectional view of a retrofocus lens system according to a sixth embodiment of the present invention.
Figure 19:
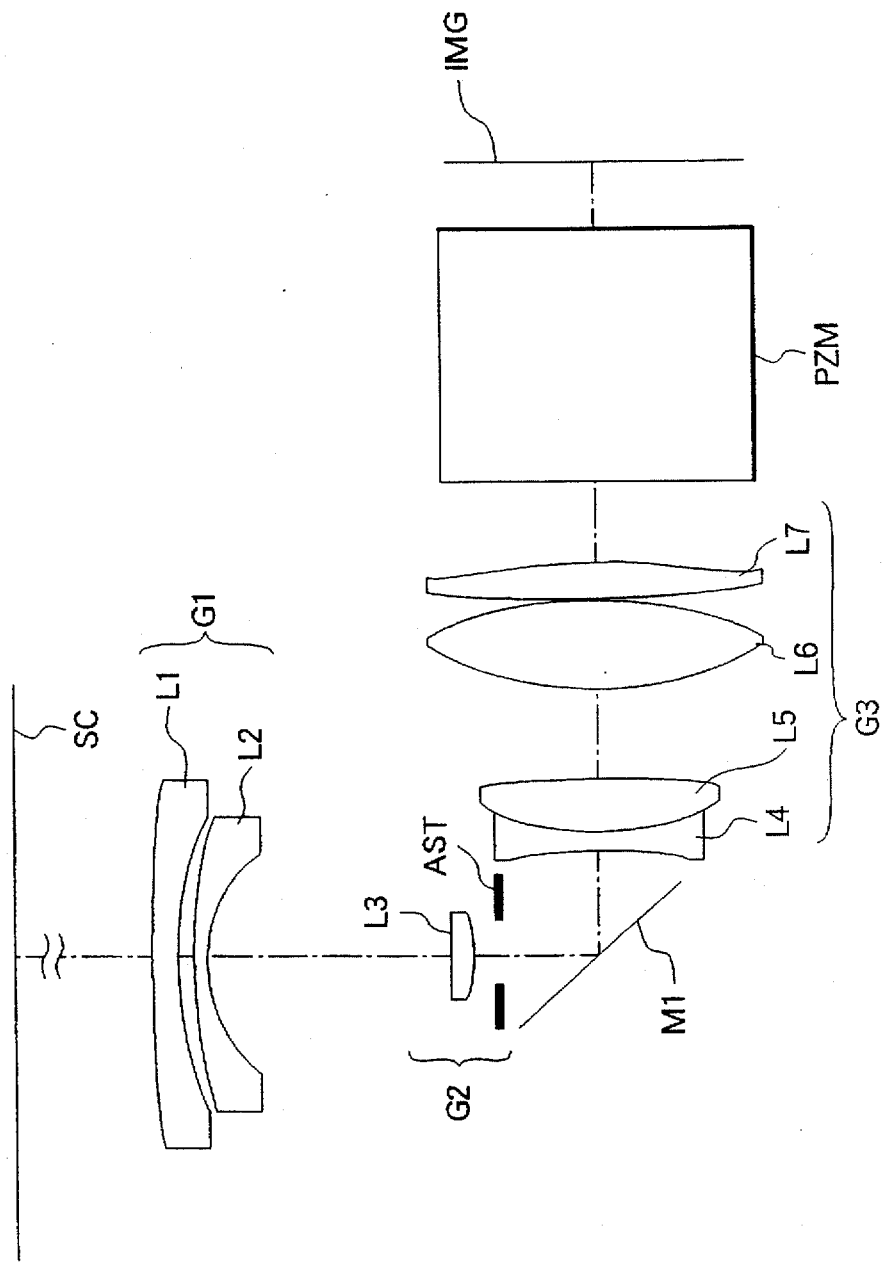
FIG. 19 is a cross sectional view showing a retrofocus lens system according to a seventh embodiment of the present invention.

The expression (1), which defines a ratio of the air gap $D_1$ between the first lens group $G_1$ and the second lens group $G_2$ to the focal length $f$ of the whole lens system, makes the refracting power of each lens groups $G_1$ to $G_3$ well-balanced as well as makes the air gap between the lens groups $G_1$ and $G_2$ (or $G_2$ and $G_3$) wide so as to allow insertion of a deflecting mirror (for example, shown in FIG. 16 or FIG. 19 described afterward). If $D_1/f$ is above the upper limit value 1.8 of the expression (1), an external diameter of the first lens group $G_1$ then increases and the overall length of the whole lens system increases unnecessarily, thereby preventing the retrofocus lens system from being compact. Conversely, if $D_1/f$ is below the lower limit value 1.3 of the expression (1), it is difficult to make a large air gap between the lens groups so as to allow insertion of a deflecting mirror. Also, if $D_1/f$ is below the lower limit value 1.3, the negative power of the first lens group $G_1$ has to be stronger, so it is difficult to correct off-axis aberration such as spherical aberration.

The expression (2), which defines a ratio of the focal length $f_2$ of the second lens group $G_2$ and the focal length $f_3$ of the third lens group $G_3$, indicates a condition that the lens system has a long back focal length and good telecentric characteristics. If $f_2/f_3$ is above the upper limit value 1.1 of the expression (2), the positive refracting power of the third lens group $G_3$ is too large, so the telecentric construction, which makes off-axis principal light beam effectively parallel, is difficult to be maintained, and the distortion is difficult to correct. Conversely, if $f_2/f_3$ is below the lower limit value 0.7 of the expression (2), the positive refracting power of the third lens group $G_3$ is too small, so the retrofocus performance becomes weaker and it is difficult to keep the back focal length long.

The expression (3), which defines a ratio of the focal length $f_1$ of the first lens group $G_1$ to the focal length $f$ of the whole lens system, indicates a condition that the lens system has a long back focal length, corrects off-axis aberration suitably by restricting the power of the front lens group, and prevents the lens groups from being large unnecessarily. If $|f_1|/f$ is above the upper limit value 1.6 of the expression (3), the negative power of the first lens group $G_1$ is too small. Therefore, the retrofocus performance becomes weaker, so it is difficult to keep the back focal length long. Also, the peripheral size of the first lens group $G_1$ becomes larger unnecessarily. Conversely, if $|f_1|/f$ is below the lower limit value 1.1 of the expression (3), the negative refracting power of the first lens group $G_1$ is too strong and a large amount of off-axis astigmatism is generated and difficult to correct.

Next, a numerical example of the retrofocus lens system according to the first embodiment will be shown in Table 1. The meaning of the symbols in the Table 1 is shown below. The focal length and magnification in Table 1 are values at a wavelength of 546.1 [nm]. The distance or length in Table 1 is expressed in millimeters.

S (or Si): i-th lens surface counted from screen side where i=1, 2, 3, ...
R: radius of curvature of lens surface
T: distance (i.e., thickness or air gap) from i-th lens surface to (i+1)-th lens surface counted from screen side
N: refractive index of lens component at a wavelength of 546.1 [nm]$v_d$: Abbe's number of lens component at a wavelength of d line
AST: aperture stop
OBJ: screen
f: focal length of whole lens system
$f_1$: focal length of first lens group $G_1$
$f_2$: focal length of second lens group $G_2$
$f_3$: focal length of third lens group $G_3$
$D_1$: air gap between first lens groups $G_1$ and second lens group $G_2$ The lens surfaces $S_1$ and $S_2$ of the first lens element $L_1$ are aspherical, and the lens surfaces $S_{13}$ and $S_{14}$ of the seventh lens element $L_7$ are also aspherical. The shape of aspherical surfaces is expressed by the following expression (4):

$$Z = \frac{Y^2/R}{\{1+(1+K)Y^2/R^2\}^{1/2}} + AY^4 + BY^6 + CY^8 + DY^{10} \quad (4)$$

where R designated a radius of the curvature, K designates a conic constant, and A, B, C and D designate respectively fourth, sixth, eighth and tenth order aspherical coefficients in an orthogonal coordinate system (X, Y, Z) where the center of each aspherical surface is set as an origin of the orthogonal coordinate system and the optical axis is set as a Z-axis.

Figure 20:
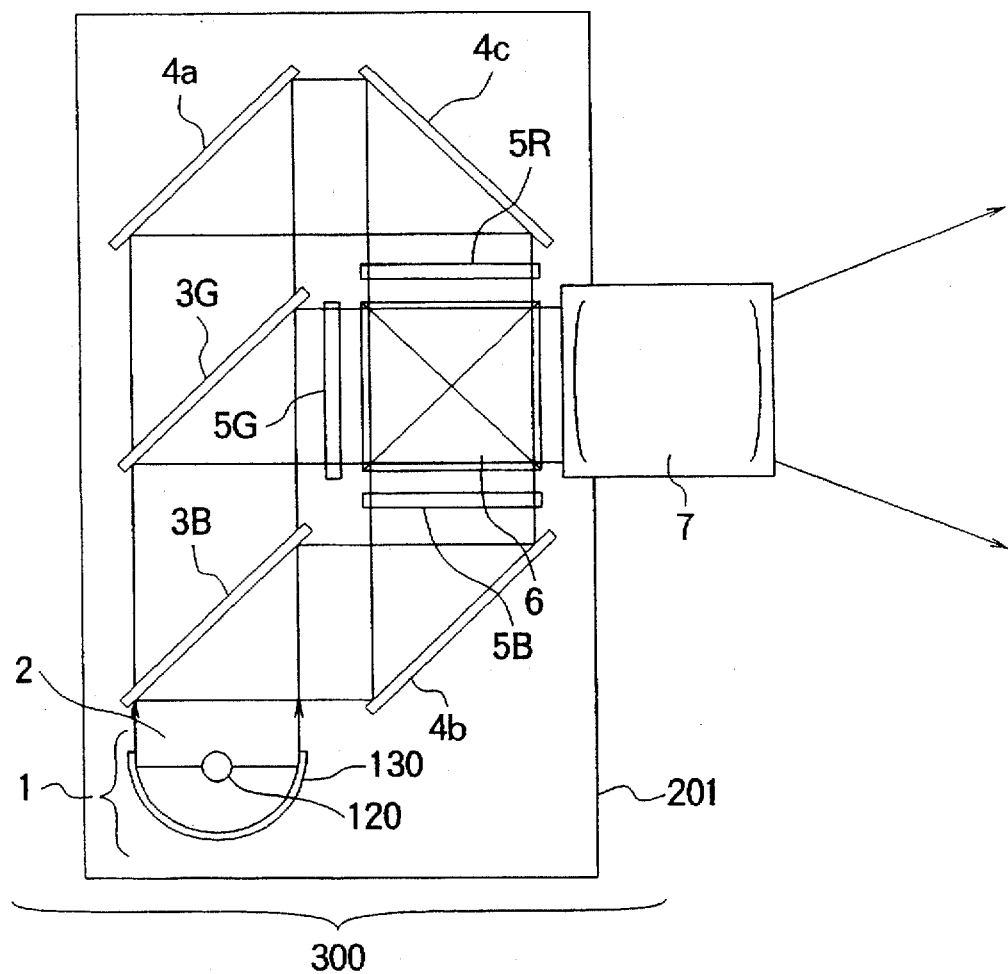
FIG. 20 is an explanatory diagram showing a conventional projection-type display apparatus.

In FIG. 1 and Table 1, $S_7$ designates the aperture stop AST which can change the aperture diameter, thereby making the brightness and the resolution of the projected image well-balanced. For example, when the retrofocus lens system of the first embodiment is incorporated as the projection lens 7 into the projection-type display apparatus of FIG. 20 and the illuminating light beam advances in the direction extremely parallel to the optical axis, enough brightness can be obtained even if the aperture diameter of the aperture stop AST is small. However, in practice, since the illuminating light beam advances in the direction at a certain angle to the optical axis, enough brightness can not be obtained when the aperture diameter of the aperture stop AST is small. Conversely, if the aperture diameter of the aperture stop AST is made large in order to increase the brightness, since the lens system has telecentric characteristics, the resolution may be decreased due to the illuminating light beam impinging on the liquid-crystal panel at a certain angle to a normal line of the liquid-crystal surface. Accordingly, it is desirable to be capable of changing the aperture diameter of the aperture stop AST in accordance with the type of the illuminating system and lenses.

Figure 2A:
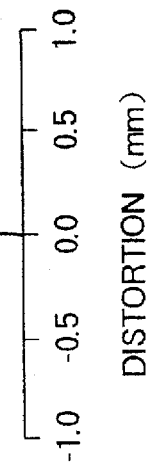
FIGS. 2A, 2B and 2C show characteristic curves of spherical aberration, astigmatism and distortion of the retrofocus lens system according to the first embodiment.
Figure 2B:
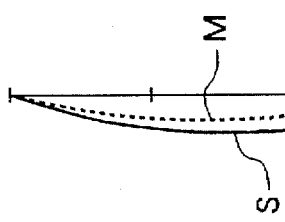
Figure 2C:
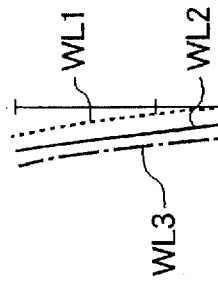

FIGS. 2A, 2B and 2C shows characteristic curves of spherical aberration (SA), astigmatism (AS) and distortion viewed from the small conjugate side according to the first embodiment. The spherical aberration curves in FIG. 2A are shown for three wavelengths ($WL_1$=610 [nm], $WL_2$=546.1 [nm], $WL_3$=470 [nm]). In FIG. 2B, M denotes a meridional plane including both the off-axis principal ray and the optical axis, and S denotes a sagittal plane including the off-axis principal ray and perpendicular to the meridional plane M. In the projection-type display apparatus incorporating the liquid-crystal panel as an image source, color aberration appearing on the whole display surface and distortion of the projected image can not be corrected by the other method, the quality of the projected image is directly affected by the color aberration and distortion. As shown in FIGS. 2A to 2C, aberrations are suitably corrected, and good performance can be obtained.

TABLE 1

| S | R | T | N | vd |
|---|---|---|---|---|
| OBJ: | INFINITY | 967.464374 | | |
| 1: | 165.52714 | 7.000000 | 1.491600 | 52.18 |
| 2: | 74.01253 | 10.596620 | | |
| 3: | 175.55911 | 4.000000 | 1.624078 | 36.37 |
| 4: | 48.87965 | 94.150033 | | |
| 5: | 162.49895 | 10.000000 | 1.704438 | 30.05 |
| 6: | −178.72209 | 1.179522 | | |
| 7: | INFINITY | 76.649699 | | |
| 8: | −77.43779 | 4.000000 | 1.855030 | 23.83 |
| 9: | 155.54494 | 15.190829 | 1.699796 | 55.46 |
| 10: | −74.00467 | 6.112814 | | |
| 11: | 124.75402 | 20.421727 | 1.625548 | 58.12 |
| 12: | 1069.19832 | 12.361415 | | |
| 13: | 282.06470 | 9.045178 | 1.491600 | 52.18 |
| 14: | −179.00534 | 24.081147 | | |
| 15: | INFINITY | 71.000000 | 1.518718 | 64.20 |
| 16: | INFINITY | 16.746643 | | |
| IMG: | INFINITY | 0.000000 | | |

| ASPHERICAL COEFFICIENT | | | | | |
|---|---|---|---|---|---|
| S | K | A | B | C | D |
| 1: | 1.871832 | 0.348233E-06 | −0.286617E-10 | −0.126833E-14 | −0.628280E-17 |
| 2: | 0.214363 | −0.240877E-06 | 0.628894E-11 | −0.227856E-13 | −0.337752E-16 |
| 13: | 3.408659 | 0.487022E-06 | −0.527650E-09 | 0.192134E-12 | −0.169119E-16 |
| 14: | −15.361755 | 0.707278E-06 | −0.536487E-09 | 0.206217E-12 | −0.194171E-16 |

| D1/f = 1.77329 | f2/f3 = 1.01413 | |f1|/f = 1.44753 |
|---|---|---|

Figure 3:
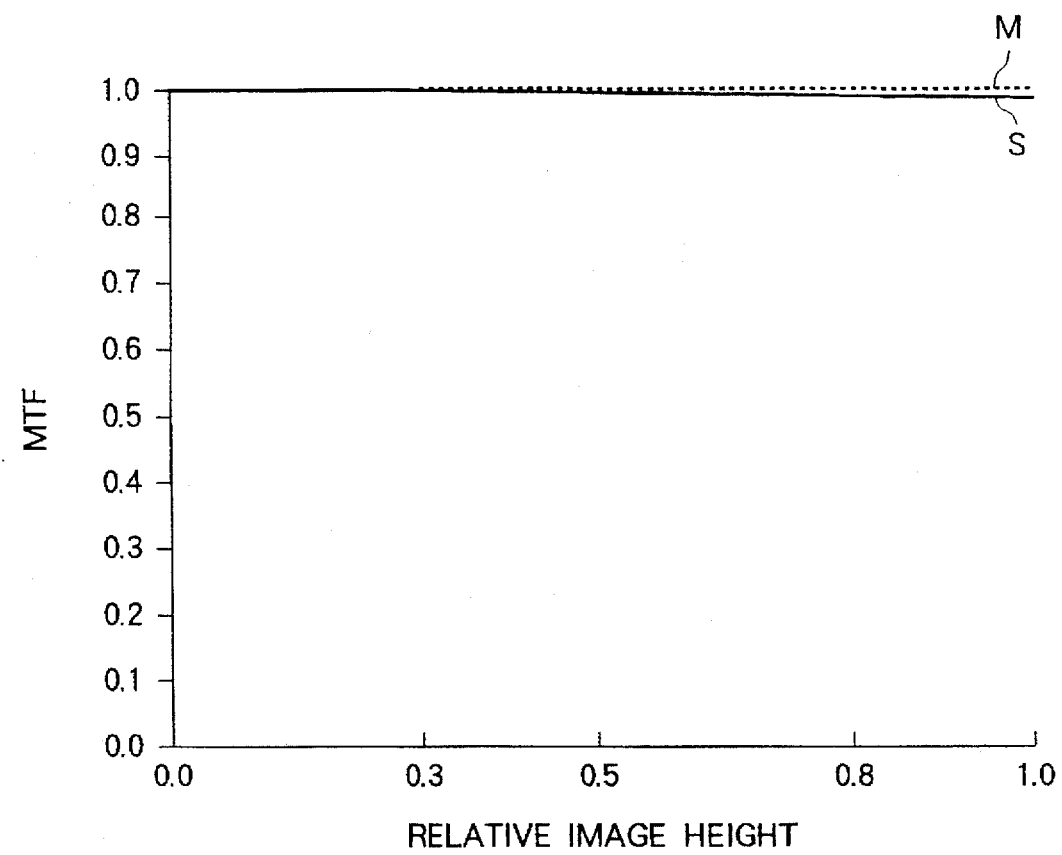
FIG. 3 is a graph showing MTF—relative image height characteristics of the retrofocus lens system according to the first embodiment.

FIG. 3 is a graph showing MTF—relative image height characteristics indicating focusing characteristics on the meridional plane M and the sagittal plane S. A vertical axis in FIG. 3 shows MTF as an index of resolution, and horizontal axis shows a relative value from a center to an edge of the screen, i.e., from 0.0 as the center to 1.0 as the edge. As shown in FIG. 3, under the condition of wavelength of 546.1 [nm] and spatial frequency of 5 [lp/mm], enough resolution can be obtained.

As described above, the retrofocus lens system of the first embodiment has a first lens group $G_1$ having a negative refracting power, a second lens group $G_2$ having a positive refracting power, and a third lens group $G_3$ having a positive refracting power, and the first lens group $G_1$ is composed of only two lens elements $L_1$ and $L_2$ having negative refracting power. Accordingly, the converging stray light resulting from the reflection in the lens surfaces of the first lens group $G_1$ can be excessively suppressed, and the projected image with good contrast can be obtained.

As described above, in the retrofocus lens system of the first embodiment, the first lens group $G_1$ includes the first lens element $L_1$ having a negative refracting power and the second lens element $L_2$ having a negative refracting power, the second lens group $G_2$ includes the third lens element having a positive refracting power, and the third lens group $G_3$ includes the fourth lens element $L_4$ having a negative refracting power, the fifth lens element $L_5$ being in contact with the fourth lens element $L_4$ and having a negative refracting power, the sixth lens element $L_6$ having a positive refracting power and the seventh lens element $L_7$ having a positive refracting power. Accordingly, even if the lens system has a wide field angel and short focal length, a long back focal length enabling to dispose the prism PZM between the projection lens and the image source can be obtained. Further, the principal ray from each image height impinging on the projection lens from the image source is parallel to the optical axis, so high peripheral light amount can be obtained.

Further, since the retrofocus lens system is constructed so as to satisfy the conditional expressions (1) to (3), the projection optical system can be compact by restricting the outer diameter of the first lens group $G_1$ and the overall length of the projection lens, and good power balance and good correction of the aberration can be accomplished.

As described above, each of the first and seventh lens elements $L_1$ and $L_7$ is composed of aspherical lens, at least one surface of which is aspherical surface. Accordingly, aspherical aberration, distortion and higher order aberrations can be suitably corrected using few lens elements, so wide field angle and good resolution can be accomplished. Also, each of the first and seventh lens elements $L_1$ and $L_7$ may have only one aspherical surface.

Additionally, since the aperture stop AST is disposed in the vicinity of the second lens element $L_2$, brightness of the projected image and focusing characteristics can be suitably set in accordance with the performance of the illuminating system before the projection lens.

Second Embodiment

Figure 4:
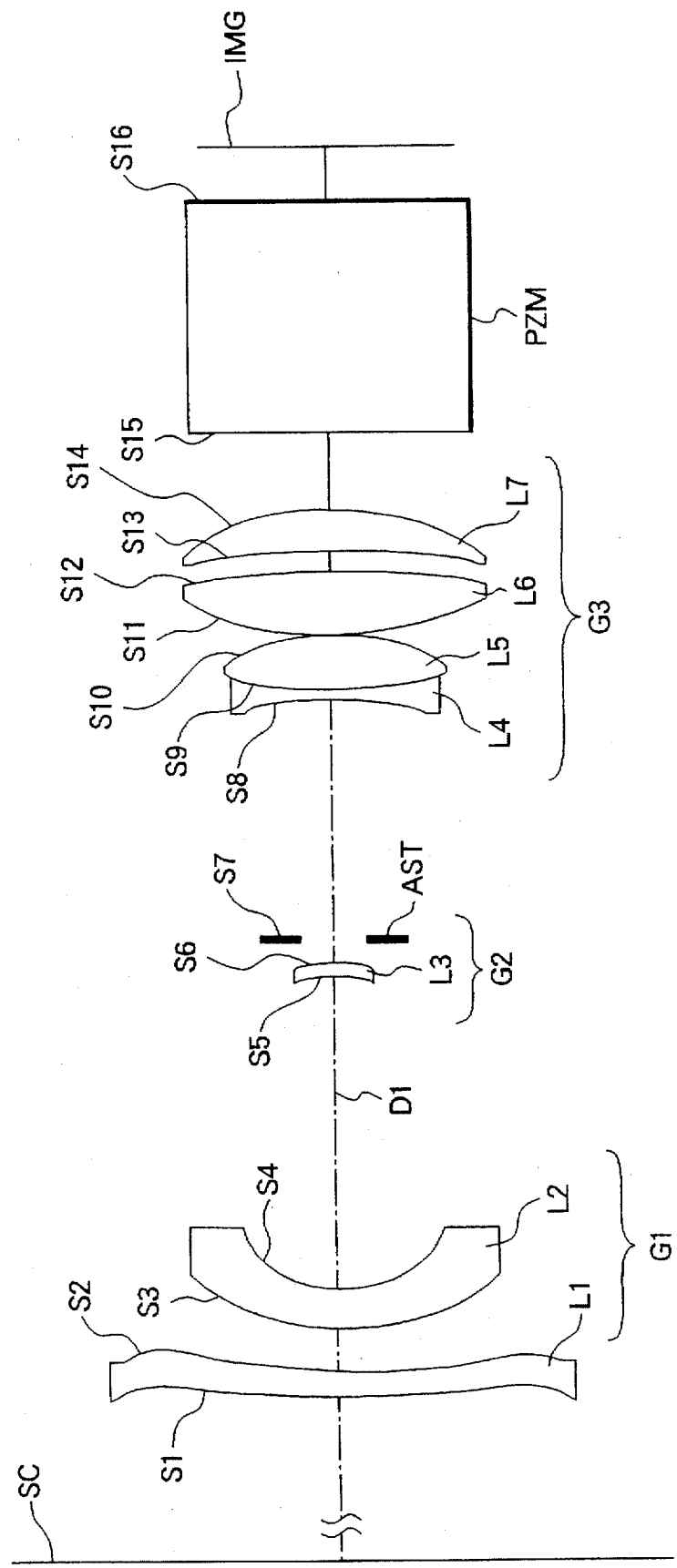
FIG. 4 is a cross sectional view of a retrofocus lens system according to a second embodiment of the present invention.
Figure 5A:
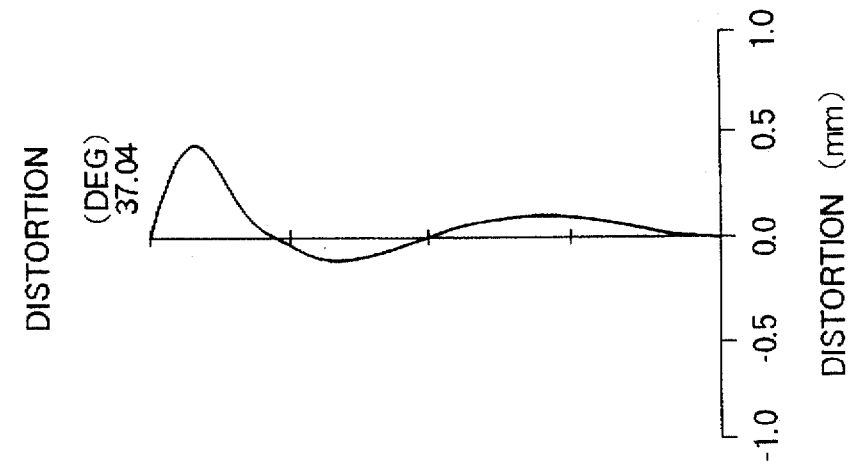
FIGS. 5A, 5B and 5C show characteristic curves of spherical aberration, astigmatism and distortion of the retrofocus lens system according to the second embodiment.
Figure 5B:
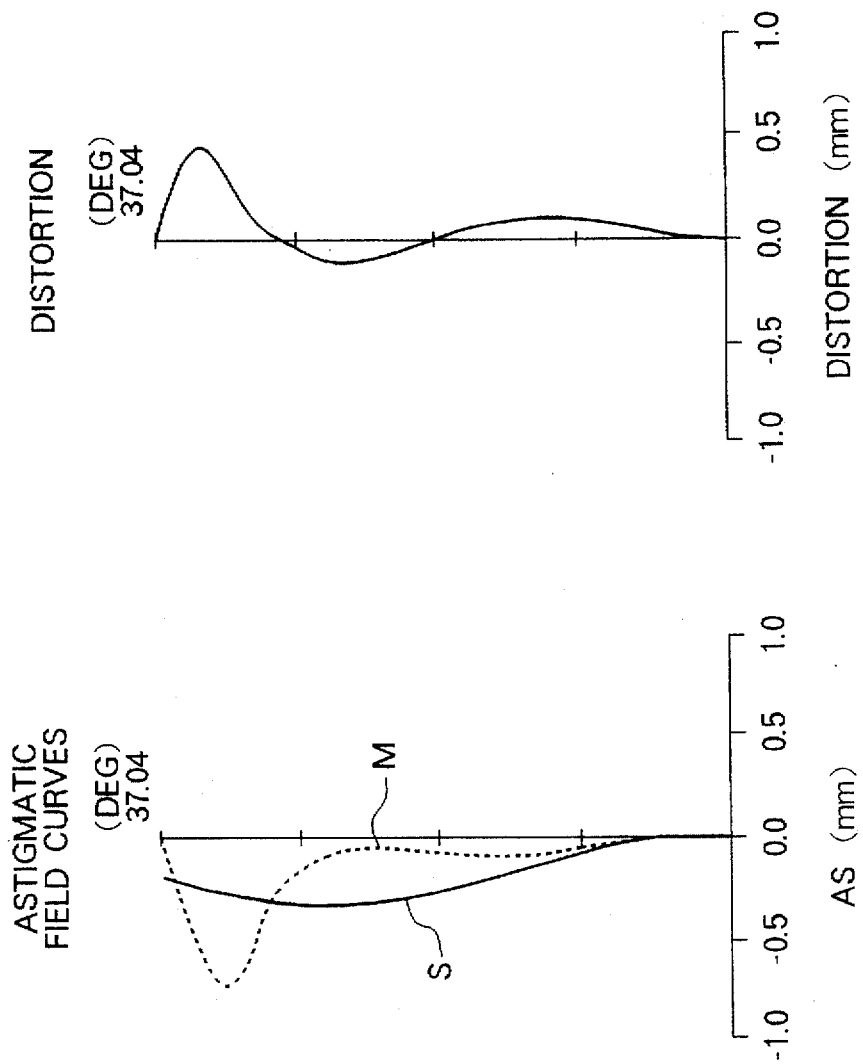
Figure 5C:
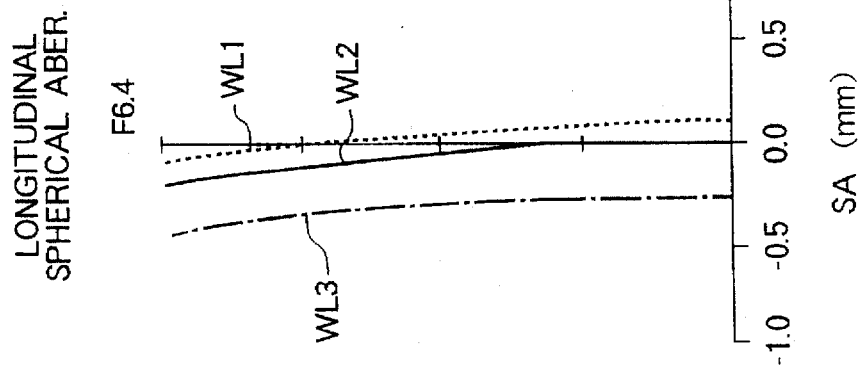
Figure 6:
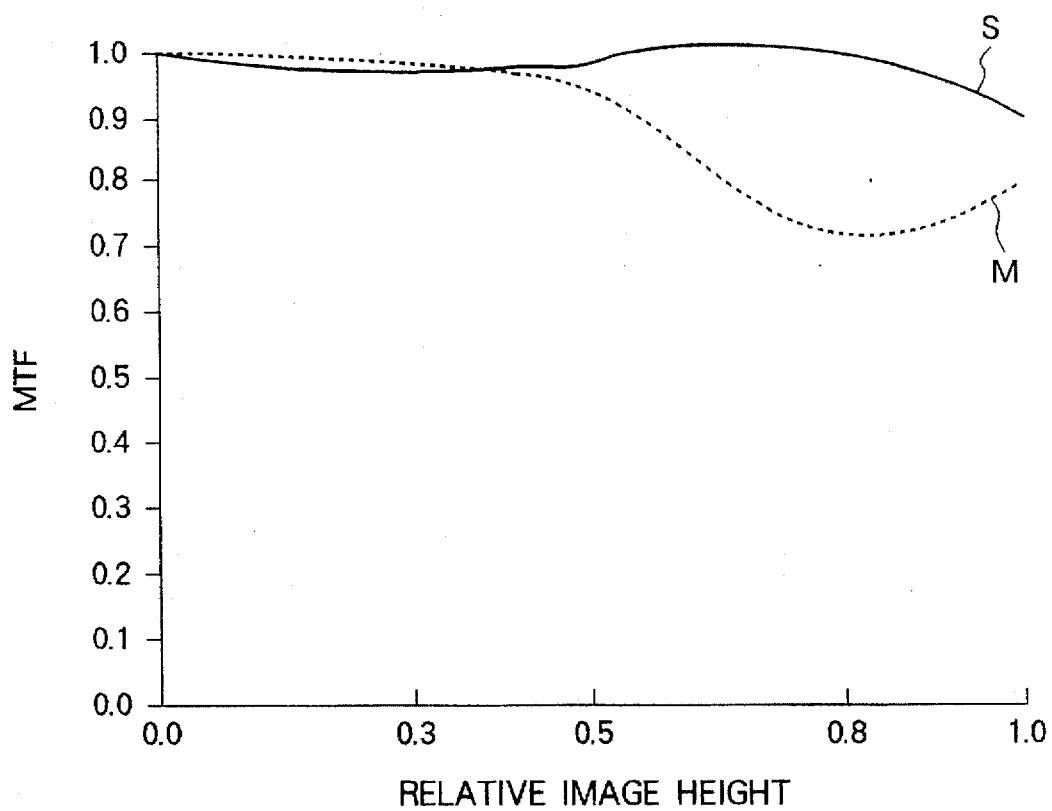
FIG. 6 is a graph showing MTF—relative image height characteristics of the retrofocus lens system according to the second embodiment.

FIG. 4 is a cross sectional view showing a retrofocus lens system according to a second embodiment of the present invention, FIGS. 5A, 5B and 5C show characteristic curves of spherical aberration, astigmatism and distortion viewed from the small conjugate side according to the second embodiment, and FIG. 6 is a graph showing MTF—relative image height characteristics indicating focusing characteristics on the meridional plane M and the sagittal plane S. The spherical aberration curves in FIG. 5A are shown for three wavelengths $WL_1$, $WL_2$, $WL_3$, and the astigmatic field curves and the distortion curve in FIGS. 5B and 5C are shown for the wavelength of 546.1 [nm]. A numerical example of the second embodiment is shown in Table 2.

Except for the above description in the second embodiment, the retrofocus lens system of the second embodiment is the same as that of the first embodiment.

TABLE 2

| S | R | T | N | vd |
|---|---|---|---|---|
| OBJ: | INFINITY | 933.149230 | | |
| 1: | 189.20613 | 7.000000 | 1.491600 | 52.18 |
| 2: | 82.20601 | 14.640944 | | |
| 3: | 64.13847 | 10.000000 | 1.624078 | 36.37 |
| 4: | 31.48899 | 87.428339 | | |
| 5: | −435.11989 | 4.000000 | 1.704438 | 30.05 |
| 6: | −69.06224 | 4.000000 | | |
| 7: | INFINITY | 73.618513 | | |
| 8: | −93.28396 | 4.000000 | 1.855030 | 23.83 |
| 9: | 119.01278 | 12.753661 | 1.699796 | 55.46 |
| 10: | −181.32392 | 1.002617 | | |
| 11: | 101.43707 | 18.031350 | 1.625548 | 58.12 |
| 12: | 288.17952 | 7.105809 | | |
| 13: | −390.53230 | 11.441748 | 1.491600 | 52.18 |
| 14: | −70.10121 | 24.081147 | | |
| 15: | INFINITY | 71.000000 | 1.518718 | 64.20 |
| 16: | INFINITY | 16.746643 | | |
| IMG: | INFINITY | 0.000000 | | |

| ASPHERICAL COEFFICIENT | | | | |
|---|---|---|---|---|
| S | K | A | B | C | D |
| 1: | −9.170244 | 0.128213E-06 | −0.896149E-10 | 0.238638E-13 | −0.815504E-17 |
| 2: | −1.336104 | −0.545947E-06 | −0.470375E-10 | −0.624315E-13 | 0.878089E-17 |
| 13: | 50.000000 | 0.105385E-07 | −0.542706E-09 | 0.188474E-12 | −0.141472E-16 |
| 14: | −0.805454 | 0.811250E-06 | −0.548988E-09 | 0.217363E-12 | −0.270582E-16 |

D1/f = 1.68897   f2/f3 = 1.05074   |f1|/f = 1.49329

Third Embodiment

Figure 7:
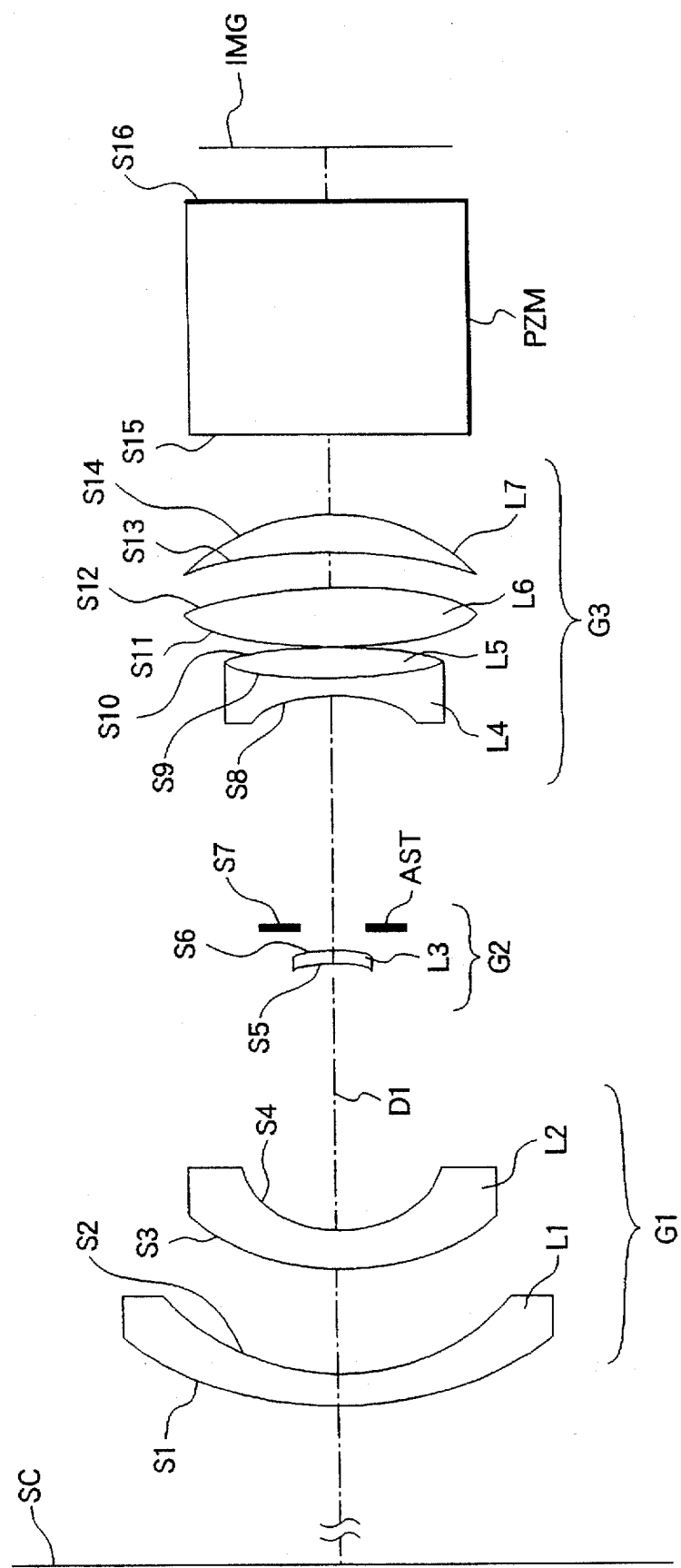
FIG. 7 is a cross sectional view of a retrofocus lens system according to a third embodiment of the present invention.
Figure 8A:
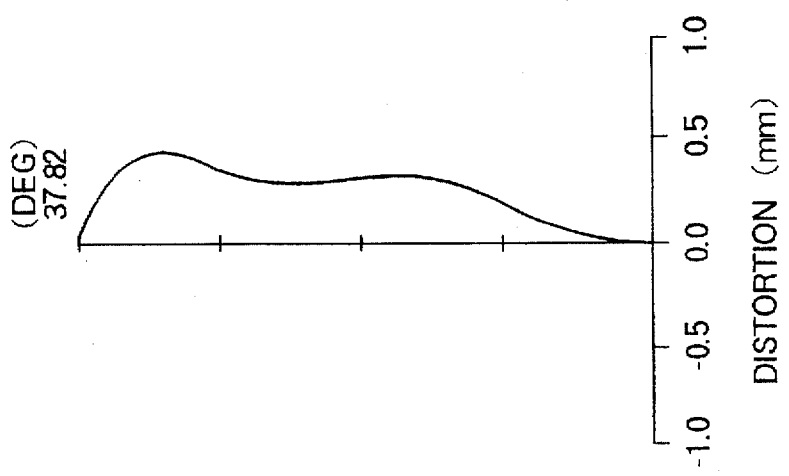
FIGS. 8A, 8B and 8C show characteristic curves of spherical aberration, astigmatism and distortion of the retrofocus lens system according to the third embodiment.
Figure 8B:
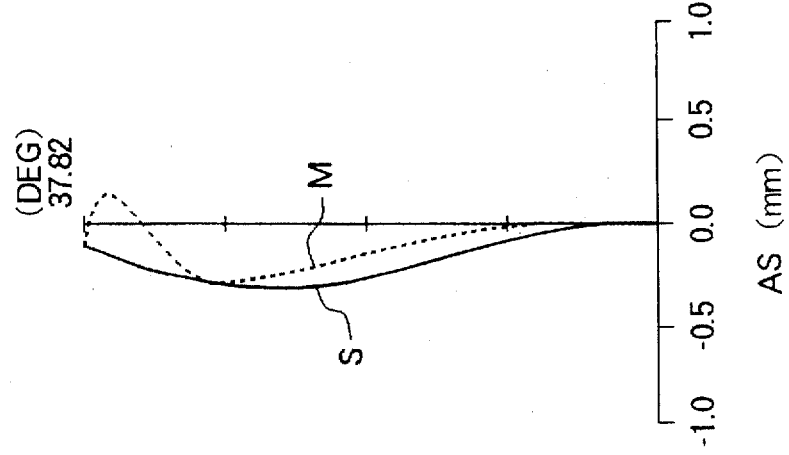
Figure 8C:
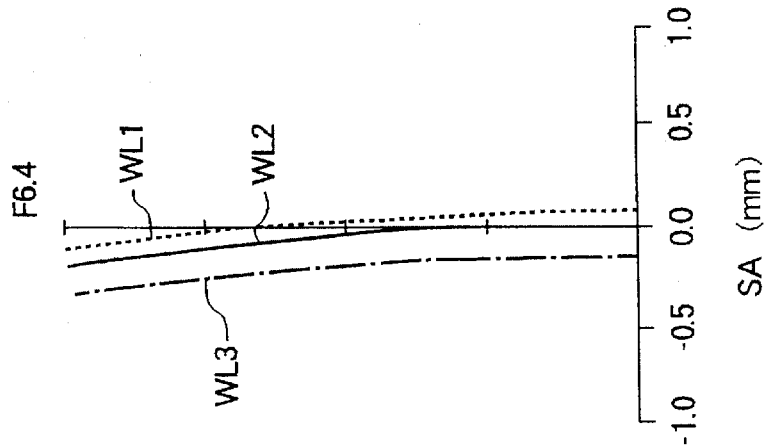
Figure 9:
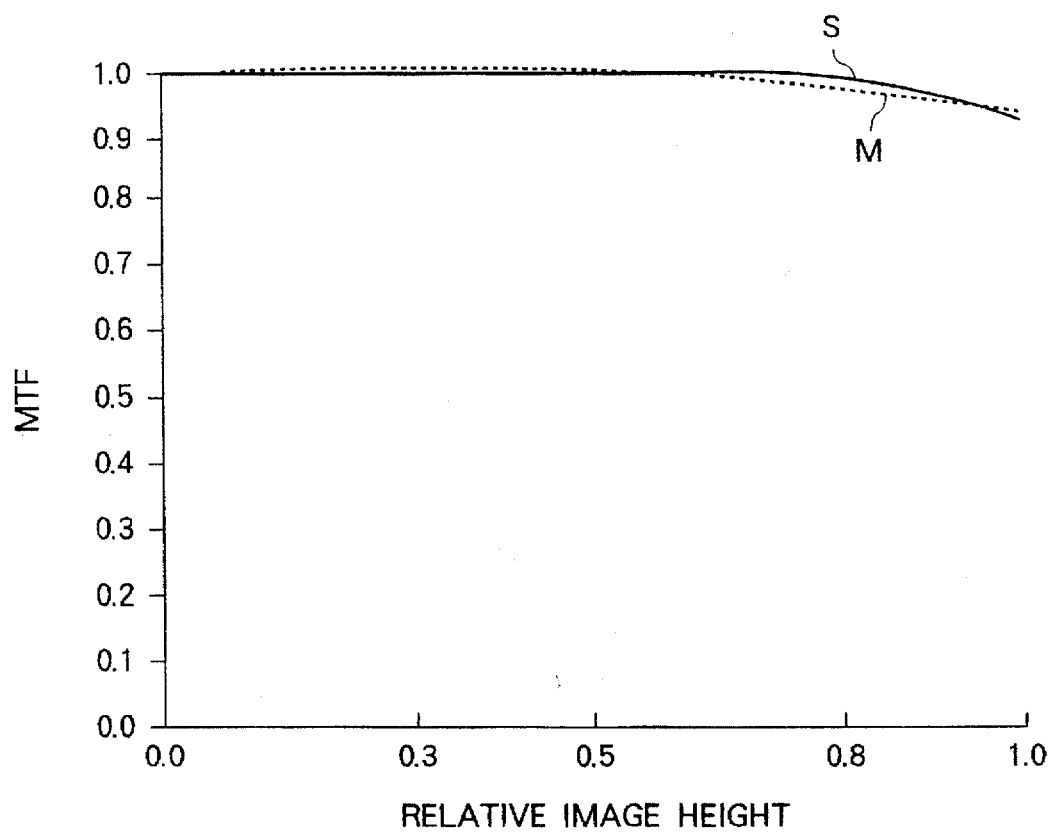
FIG. 9 is a graph showing MTF—relative image height characteristics of the retrofocus lens system according to the third embodiment.

FIG. 7 is a cross sectional view showing a retrofocus lens system according to a third embodiment of the present invention, FIGS. 8A, 8B and 8C show characteristic curves of spherical aberration, astigmatism and distortion viewed from the small conjugate side according to the third embodiment, and FIG. 9 is a graph showing MTF—relative image height characteristics indicating focusing characteristics on the meridional plane M and the sagittal plane S. The spherical aberration curves in FIG. 8A are shown for three wavelengths $WL_1$, $WL_2$, $WL_3$, and the astigmatic field curves and the distortion curve in FIGS. 8B and 8C are shown for the wavelength of 546.1 [nm]. A numerical example of the third embodiment is shown in Table 3.

Figure 12:
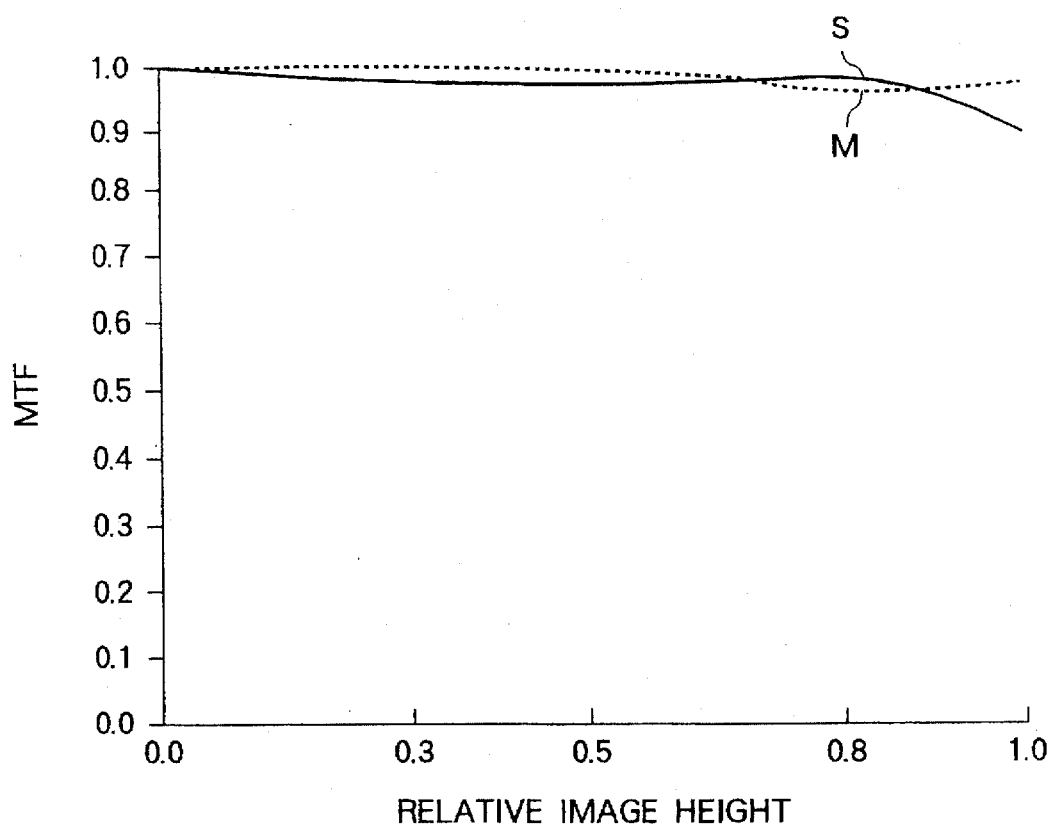
FIG. 12 is a graph showing MTF—relative image height characteristics of the retrofocus lens system according to the fourth embodiment.

Except for the above description in the third embodiment, the retrofocus lens system of the third embodiment is the same as that of the first embodiment.

curves of spherical aberration, astigmatism and distortion viewed from the small conjugate side according to the fourth embodiment, and FIG. 12 is a graph showing MTF—relative image height characteristics indicating focusing characteristics on the meridional plane M and the sagittal plane S. The spherical aberration curves in FIG. 11A are shown for three wavelengths $WL_1$, $WL_2$, $WL_3$, and the astigmatic field curves and the distortion curve in FIGS. 11B and 11C are shown for the wavelength of 546.1 [nm]. A numerical example of the fourth embodiment is shown in Table 4.

Except for the above description in the fourth embodiment, the retrofocus lens system of the fourth embodiment is the same as that of the first embodiment.

TABLE 3

| S | R | T | N | vd |
|---|---|---|---|---|
| OBJ: | INFINITY | 896.604800 | | |
| 1: | 74.22601 | 9.343080 | 1.491600 | 52.18 |
| 2: | 44.50944 | 28.373802 | | |
| 3: | 53.54845 | 8.546441 | 1.624078 | 36.37 |
| 4: | 28.59266 | 70.905719 | | |
| 5: | −162.85411 | 4.072817 | 1.704438 | 30.05 |
| 6: | −52.87450 | 4.500000 | | |
| 7: | INFINITY | 68.411470 | | |
| 8: | −54.69179 | 4.000000 | 1.855030 | 23.83 |
| 9: | 210.79145 | 10.157529 | 1.699796 | 55.46 |
| 10: | −111.54865 | 0.100000 | | |
| 11: | 130.02599 | 16.392726 | 1.625548 | 58.12 |
| 12: | −147.48293 | 8.968965 | | |
| 13: | −804.31942 | 10.817984 | 1.491600 | 52.18 |
| 14: | −72.52239 | 24.081147 | | |
| 15: | INFINITY | 71.000000 | 1.518718 | 64.20 |
| 16: | INFINITY | 16.746643 | | |
| IMG: | INFINITY | 0.000000 | | |

| ASPHERICAL COEFFICIENT | | | | |
|---|---|---|---|---|
| S | K | A | B | C | D |
| 1: | −2.810685 | 0.205135E-06 | −0.779654E-10 | 0.277495E-13 | −0.657845E-17 |
| 2: | −0.991893 | −0.402165E-05 | −0.560368E-10 | −0.713993E-13 | 0.392920E-17 |
| 13: | 31.502864 | −0.480426E-08 | −0.627383E-09 | 0.190062E-12 | −0.246875E-16 |
| 14: | −0.288962 | 0.529709E-06 | −0.606817E-09 | 0.197730E-12 | −0.253348E-16 |

D1/f = 1.41052    f2/f3 = 1.07435    lf1l/f = 1.43328

Fourth Embodiment

Figure 10:
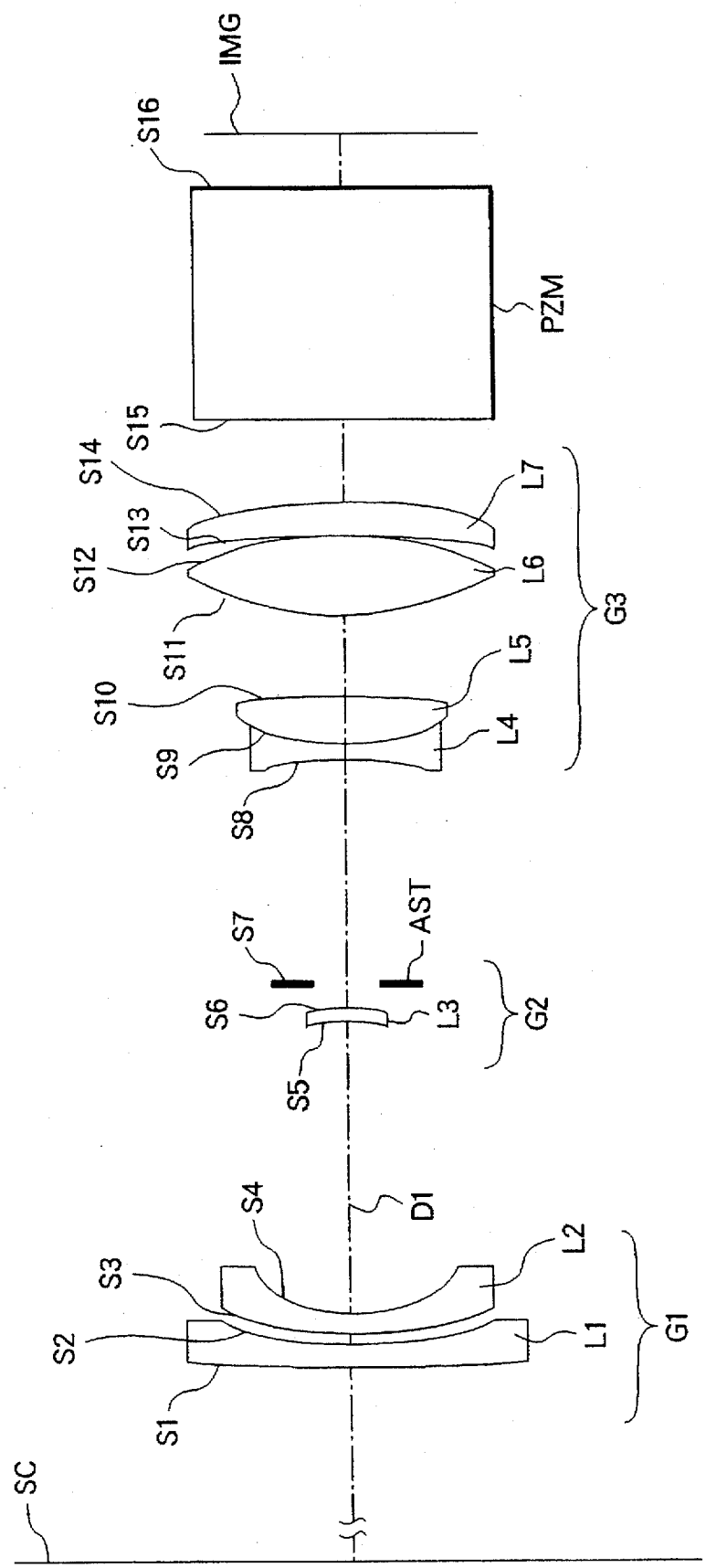
FIG. 10 is a cross sectional view of a retrofocus lens system according to a fourth embodiment of the present invention.

FIG. 10 is a cross sectional view showing a retrofocus lens system according to a fourth embodiment of the present invention, FIGS. 11A, 11B and 11C show characteristic

TABLE 4

| S | R | T | N | vd |
|---|---|---|---|---|
| OBJ: | INFINITY | 987.856323 | | |
| 1: | 697.65620 | 7.000000 | 1.491600 | 52.18 |
| 2: | 103.71825 | 3.000000 | | |
| 3: | 104.24967 | 4.000000 | 1.624078 | 36.37 |
| 4: | 36.89975 | 80.000000 | | |
| 5: | 133.38960 | 4.000000 | 1.704438 | 30.05 |
| 6: | −123.11420 | 4.000000 | | |
| 7: | INFINITY | 56.695088 | | |
| 8: | −101.66776 | 4.000000 | 1.855030 | 23.83 |
| 9: | 61.08623 | 12.304455 | 1.699796 | 55.46 |
| 10: | −171.99281 | 25.919892 | | |
| 11: | 125.03024 | 20.396452 | 1.625548 | 58.12 |
| 12: | −132.09939 | 1.000000 | | |
| 13: | −599.94400 | 8.000000 | 1.491600 | 52.18 |
| 14: | −154.91472 | 24.081147 | | |
| 15: | INFINITY | 71.000000 | 1.518718 | 64.20 |
| 16: | INFINITY | 16.746643 | | |
| IMG: | INFINITY | 0.000000 | | |

TABLE 4-continued

| ASPHERICAL COEFFICIENT | | | | | |
|---|---|---|---|---|---|
| S | K | A | B | C | D |
| 1: | 50.000000 | 0.375097E-06 | -0.190533E-09 | 0.206083E-13 | -0.158279E-16 |
| 2: | -5.512232 | -0.440638E-06 | -0.220693E-10 | -0.152287E-12 | 0.112366E-16 |
| 13: | 3.781084 | 0.294940E-06 | -0.470126E-09 | 0.196879E-12 | -0.242641E-16 |
| 14: | -1.408881 | 0.980281E-06 | -0.498748E-09 | 0.209590E-12 | -0.243686E-16 |
| D1/f = 1.49336 | | f2/f3 = 0.79708 | | |f1|/f = 1.24802 | |

Fifth Embodiment

Figure 13:
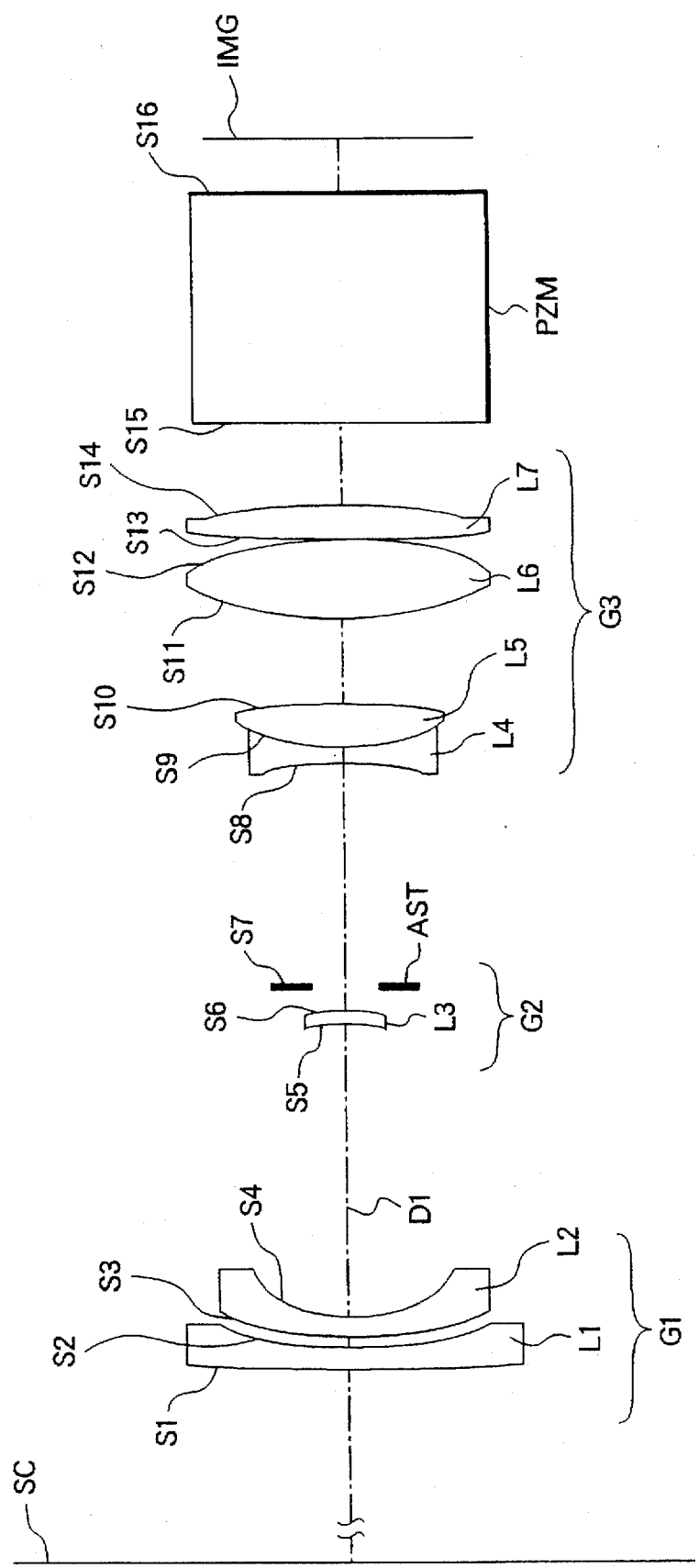
FIG. 13 is a cross sectional view of a retrofocus lens system according to a fifth embodiment of the present invention.
Figures 14A, 14B, 14C:
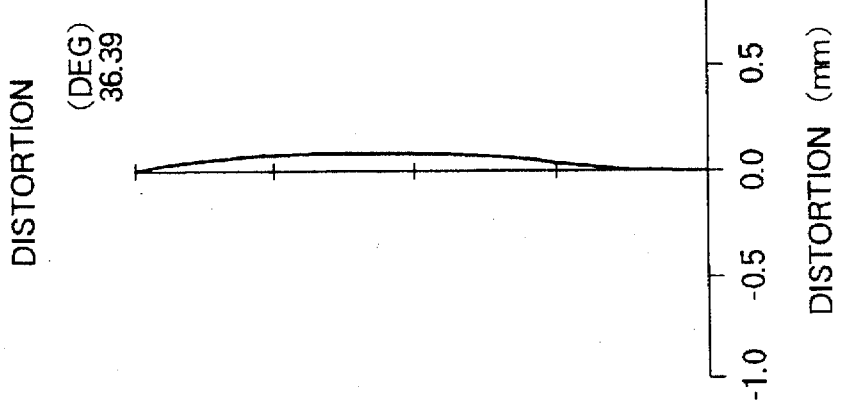
FIGS. 14A, 14B and 14C show characteristic curves of spherical aberration, astigmatism and distortion of the retrofocus lens system according to the fifth embodiment.
Figure 15:
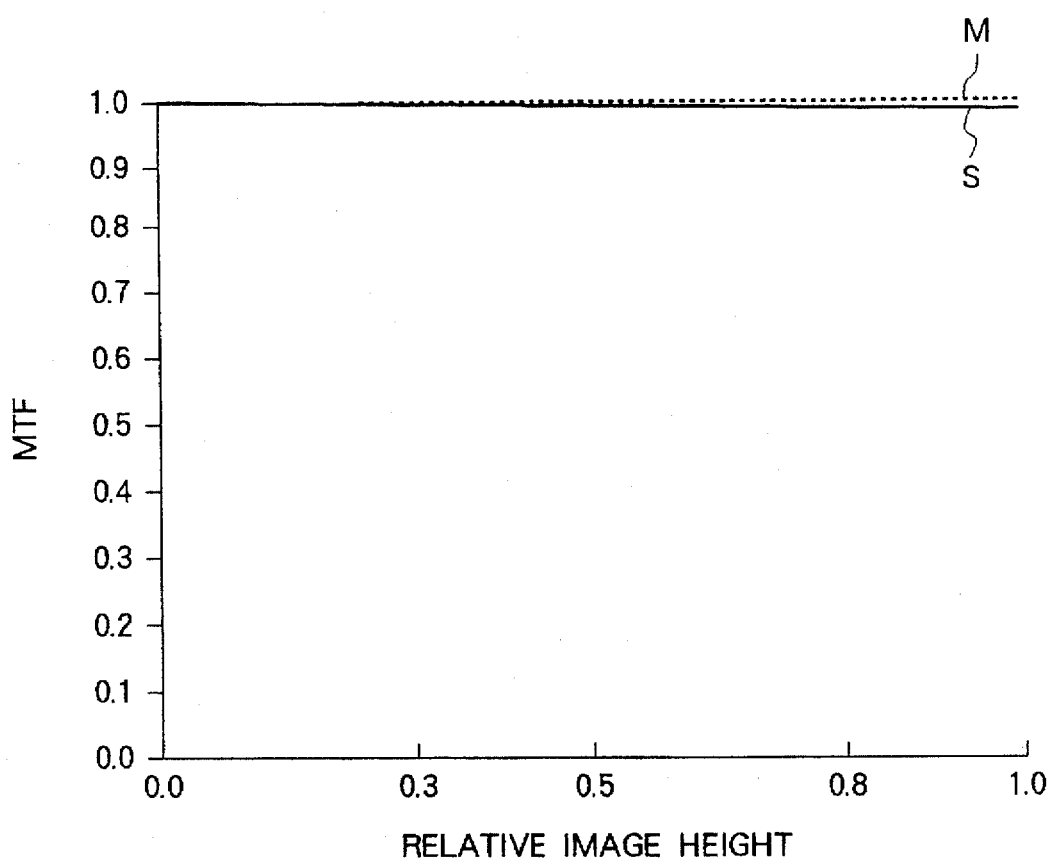
FIG. 15 is a graph showing MTF—relative image height characteristics of the retrofocus lens system according to the fifth embodiment.

FIG. 13 is a cross sectional view showing a retrofocus lens system according to a fifth embodiment of the present invention, FIGS. 14A, 14B and 14C show characteristic curves of spherical aberration, astigmatism and distortion viewed from the small conjugate side according to the fifth embodiment, and FIG. 15 is a graph showing MTF—relative image height characteristics indicating focusing characteristics on the meridional plane M and the sagittal plane S. The spherical aberration curves in FIG. 14A are shown for three wavelengths $WL_1$, $WL_2$, $WL_3$, and the astigmatic field curves and the distortion curve in FIGS. 14B and 14C are shown for the wavelength of 546.1 [nm]. A numerical example of the fifth embodiment is shown in Table 5.

Except for the above description in the fifth embodiment, the retrofocus lens system of the fifth embodiment is the same as that of the first embodiment.

first embodiment (FIG. 1) except for providing a mirror $M_1$ between the lens elements $L_2$ and $L_3$ for deflecting an optical path. However, the lens groups $G_1$ to $G_3$ may be replaced with those of any one of the second to fifth embodiments.

Figure 17:
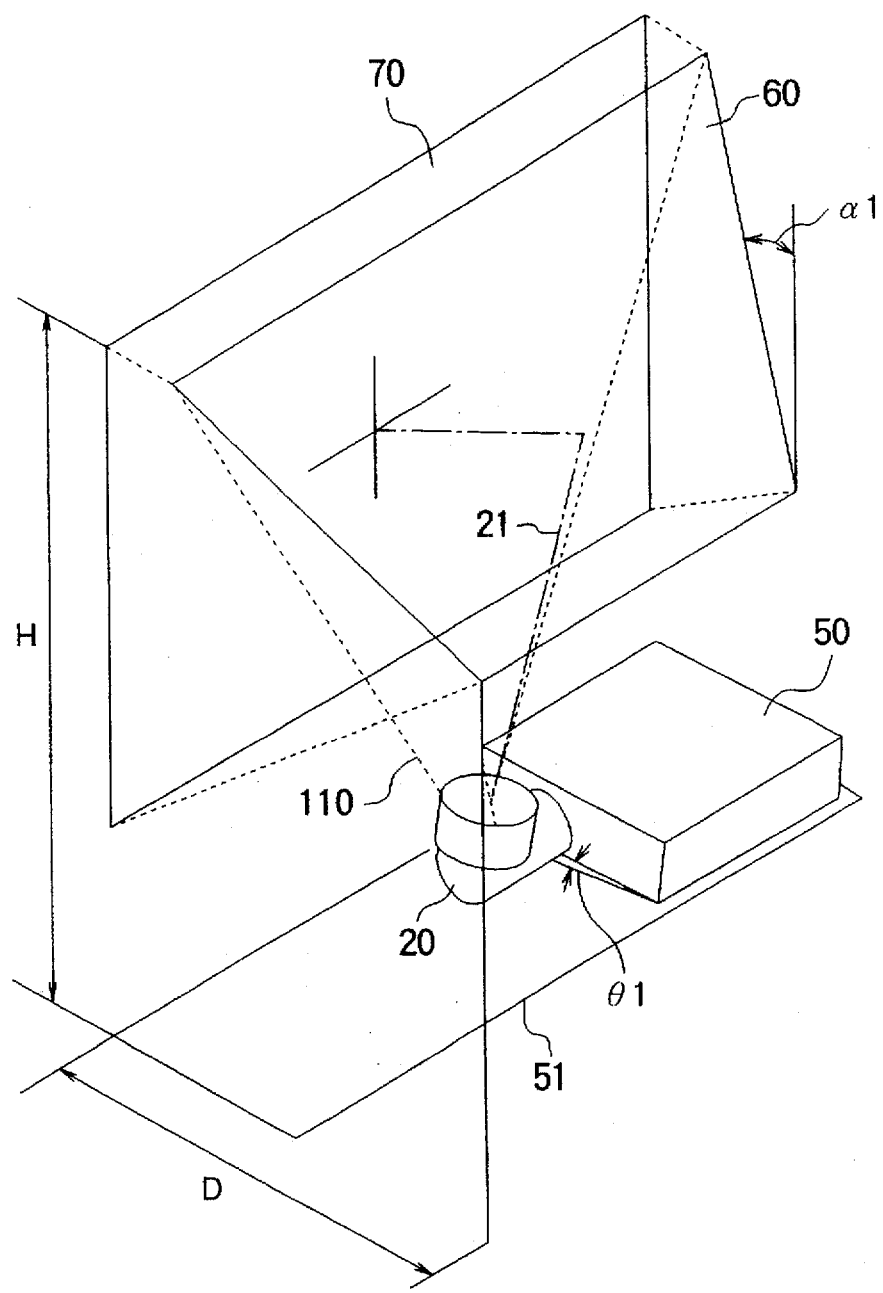
FIG. 17 is a perspective view schematically showing a projection-type display apparatus.

FIG. 17 is a perspective view schematically showing a projection-type display apparatus including a cabinet (only a bottom plate 51 is shown in FIG. 17), an optical unit 50 disposed on the bottom plate 51, the projection lens 20 connected to the optical unit 50, a large mirror 60 for deflecting a light beam from the projection lens 20, and a screen 70 on which the light beam is projected and an image is formed. The mirror 60 and the screen 70 are fixed to the cabinet. A viewer (not shown in the figure) watches the projected image in front of the screen 70 (i.e., from the left side in FIG. 17).

Figure 18A:
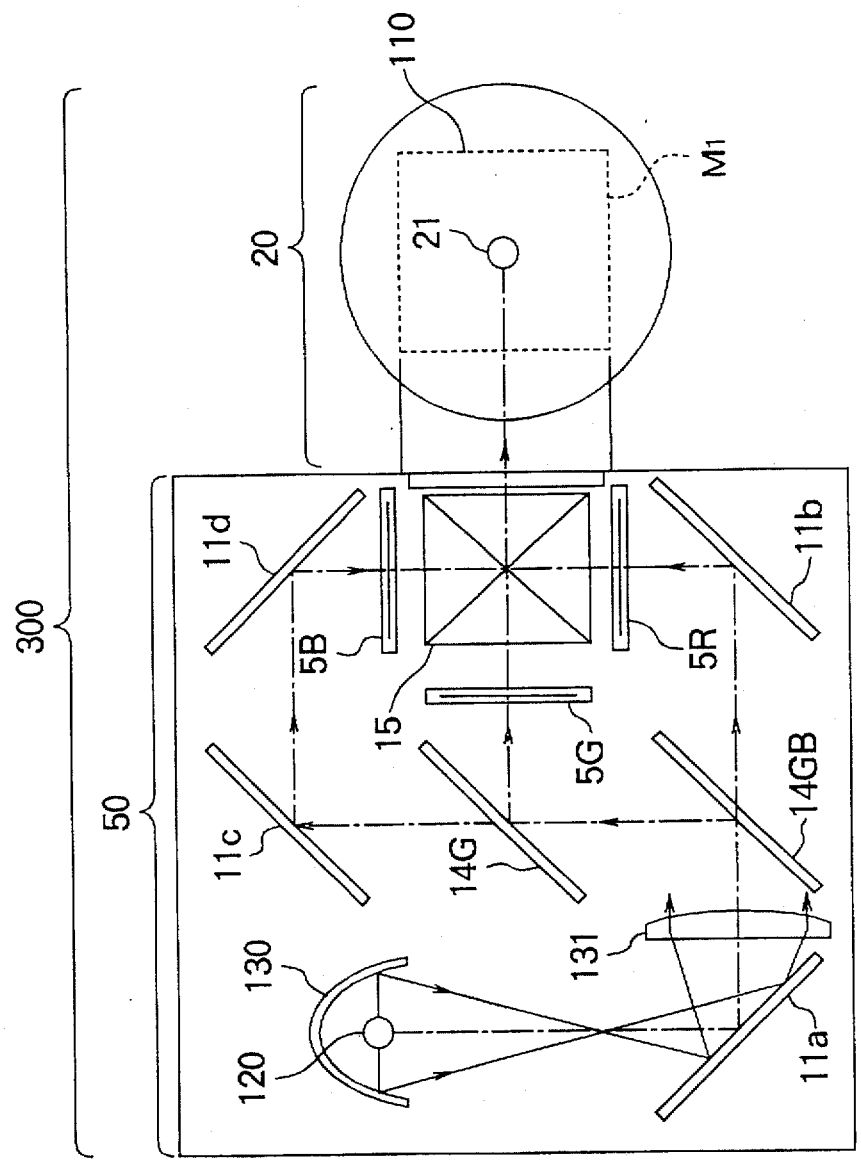
FIGS. 18A and 18B are plane and side views showing the internal construction of the projector.
Figure 18B:
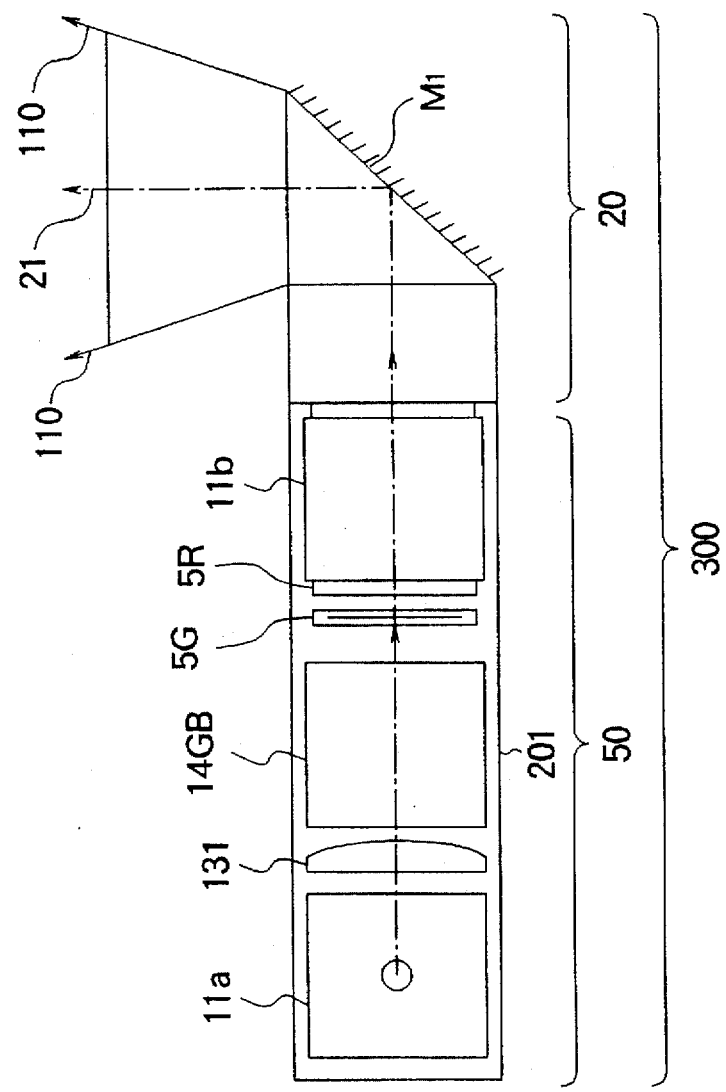

FIGS. 18A and 18B are diagrams showing the internal construction of the projector 300 including the optical unit

TABLE 5

| S | R | T | N | vd |
|---|---|---|---|---|
| OBJ: | INFINITY | 986.566115 | | |
| 1: | 625.48299 | 7.000000 | 1.491600 | 52.18 |
| 2: | 100.22744 | 3.000000 | | |
| 3: | 96.05606 | 4.000000 | 1.624078 | 36.37 |
| 4: | 35.72252 | 80.000000 | | |
| 5: | 167.43434 | 4.000000 | 1.704438 | 30.05 |
| 6: | -105.39354 | 4.000000 | | |
| 7: | INFINITY | 58.981009 | | |
| 8: | -141.49324 | 4.000000 | 1.855030 | 23.83 |
| 9: | 53.73563 | 12.136041 | 1.699796 | 55.46 |
| 10: | -534.11295 | 22.507176 | | |
| 11: | 119.12265 | 22.612512 | 1.625548 | 58.12 |
| 12: | -118.97288 | 1.000000 | | |
| 13: | -2651.82984 | 8.000000 | 1.491600 | 52.18 |
| 14: | -183.39362 | 24.081147 | | |
| 15: | INFINITY | 71.000000 | 1.518718 | 64.20 |
| 16: | INFINITY | 17.116000 | | |
| IMG: | INFINITY | 0.000000 | | |

| ASPHERICAL COEFFICIENT | | | | | |
|---|---|---|---|---|---|
| S | K | A | B | C | D |
| 1: | 43.340121 | 0.637201E-08 | -0.282700E-09 | 0.247085E-13 | -0.174637E-16 |
| 2: | -3.076236 | -0.323710E-06 | -0.627088E-10 | -0.228034E-12 | 0.292215E-16 |
| 13: | -50.000000 | 0.667262E-06 | -0.364287E-09 | 0.207556E-12 | -0.416817E-16 |
| 14: | -7.826167 | 0.125273E-05 | -0.353133E-09 | 0.218791E-12 | -0.386600E-16 |
| D1/f = 1.49524 | | f2/f3 = 0.801646 | | |f1|/f =0 1.24038 | |

Sixth Embodiment

FIG. 16 is a cross sectional view showing a retrofocus lens system 20 according to a sixth embodiment of the present invention. The same symbols are attached to the elements corresponding to those shown in FIG. 1. The retrofocus lens system (hereinafter refereed to a projection lens) 20 of the sixth embodiment is identical to that of the 50 and the projection lens 20, wherein FIG. 18A is a plan view in which the optical system before the projection lens 20 is disposed, and FIG. 18B is a side view. As shown in FIGS. 18A and 18B, the optical unit 50 of the projector 300 contains a white light source 120 such as a metal halide lamp or a xenon lamp or halogen lamp, an elliptical mirror 130, a mirror 11a and a collimator lens 131. Further, the optical unit 50 also contains dichroic mirrors 14GB and 14G, mirrors 11b, 11c and 11d, liquid-crystal panels 5R, 5G and 5B, and a dichroic prism 15. Further, the projection lens 20 of the projector 300 contains the deflecting mirror $M_1$, as shown in FIG. 16.

Next, the action of the apparatus according to the sixth embodiment will be described. As shown in FIGS. 18A and 18B, a light beam emitted by the white light source 120 is converged after reflection by the elliptical mirror 130 and reflected by the mirror 11a so as to impinge on the condenser lens 131 which converts it to a parallel light beam. The parallel light beam converted by the condenser lens 131 is split into three primary colors, red, green and blue, by a dichroic mirror 14GB that reflects green and blue light but transmits red light, and a dichroic mirror 14G that reflects green light but transmits blue light. The red light is deflected by the mirror 11b so as to irradiate the liquid-crystal panel 3R, the blue light is deflected by the mirrors 11c and 11d so as to irradiate the liquid-crystal panel 5B, and the green light is reflected by a dichroic mirror 14G so as to irradiate the liquid-crystal panel 5G.

The light beams modulated by the images displayed on the liquid-crystal panels 5R, 5G and 5B are synthesized by the dichroic prism 15, and the synthesized light beam impinges on the projection lens 20. As described in the preceding embodiments, the deflecting mirror $M_1$ is built into the projection lens 20. As shown in FIG. 18B, the tilt angle of the deflecting mirror $M_1$ with respect to the horizontal plane is 45°. The synthesized light beam is therefore deflected by 90° by the deflecting mirror $M_1$, and the projected light beam 110 is emitted from the projection lens 4. The optical system within the optical box 201 before the projection lens 20 is disposed on a plane parallel to a bottom surface 201 of the optical unit 50.

In order to make the size (depth D and height H) of the apparatus small, it is desirable that the following conditional expression (5) is satisfied:

$$0° \leq \theta_1 \leq 20° \qquad (5)$$

where the angle $\theta_1$ is the tilt angle between the bottom plate 51 of the cabinet and the bottom plate of the box 50, and is equal to an angle between a vertical plane parallel to the screen 5 and the optical axis 21 of light beam 110 deflected by the deflecting mirror $M_1$ and emitted from the projection lens 20 in an upward direction. If $\theta_1$ is below the lower limit value 0° of the expression (5), the depth D of the apparatus increases unnecessarily. Conversely, if $\theta_1$ is above the upper limit value 20° of the expression (5), the height H of the apparatus increases unnecessarily.

Seventh Embodiment

FIG. 19 is a cross sectional view showing a retrofocus lens system 20 according to a seventh embodiment. The same symbols are attached to the elements corresponding to those shown in FIG. 16. The retrofocus lens system 20 of the seventh embodiment is identical to that of FIG. 16 except for providing a mirror $M_1$ between the aperture stop AST and the lens element $L_4$ for deflecting an optical path. Since the optical path in the retrofocus lens system 20 is deflected between the second and third lens groups $G_2$ and $G_3$, the projector using the retrofocus lens system can be made small in size. Except for the above explanation, the retrofocus lens system of the seventh embodiment is identical to that of the Sixth Embodiment.

What is claimed is:

1. A retrofocus lens system comprising, in order from a large conjugate side:

a first lens group having a negative refracting power and including a plurality of lens elements, said first lens group including, in order from the large conjugate side, a first lens element having a negative refracting power and a second lens element having a negative refracting power;

a second lens group having a positive refracting power, said second lens group including, in order from the large conjugate side, a third lens element having a positive refracting power; and a third lens group having a positive refracting power, said third lens group including, in order from the large conjugate side, a fourth lens element having a negative refracting power, a fifth lens element bonded to said fourth lens element and having a positive refracting power, a sixth lens element having a positive refracting power and a seventh lens element having a positive refracting power;

wherein each of said lens elements of said first lens group has a negative refracting power.

2. A retrofocus lens system of claim 1, wherein following conditional expressions (1) to (3) are satisfied:

$$1.3 < D_1/f < 1.8 \qquad (1)$$

$$0.7 < f_2/f_3 < 1.1 \qquad (2)$$

$$1.1 < |f_1|/f < 1.6. \qquad (3)$$

where $D_1$ is an air gap between said first lens group and said second lens group, $f_1$ is a focal length of said first lens group, $f_2$ is a focal length of said second lens group, $f_3$ is a focal length of said third lens group, and f is a focal length of whole lens system including said first to third lens groups.

3. A retrofocus lens system comprising, in order from a large conjugate side:

a first lens group having a negative refracting power and including a plurality of lens elements, said first lens group including, in order from the large conjugate side, a first lens element having a negative refracting power and a second lens element having a negative refracting power;

a second lens group having a positive refracting power, said second lens group including, in order from the large conjugate side, a third lens element having a positive refracting power; and a third lens group having a positive refracting power, said third lens group including, in order from the large conjugate side, a fourth lens element having a negative refracting power, a fifth lens element bonded to said fourth lens element and having a positive refracting power, a sixth lens element having a positive refracting power and a seventh lens element having a positive refracting power, wherein at least one surface of said first lens element is aspherical, and at least one surface of said seventh lens element is aspherical.

4. The retrofocus lens system of claim 1, further comprising an aperture stop, disposed on a small conjugate side of said second lens group, for adjusting brightness of whole lens system.

5. The retrofocus lens system of claim 1, further comprising a mirror, disposed between said first lens group and said second lens group, for deflecting an optical path.

6. The retrofocus lens system of claim 1, further comprising a mirror, disposed between said second lens group and said third lens group, for deflecting an optical path.

7. A projection-type display apparatus comprising:

a cabinet;

a screen supported by said cabinet;

a mirror disposed within said cabinet and at a rear of said screen; and a projector including a retrofocus lens system for projecting an image via said mirror onto said screen;

said retrofocus lens system comprising, in order from a large conjugate side:

a first lens group having a negative refracting power and including a plurality of lens elements, said first lens group including, in order from the large conjugate side, a first lens element having a negative refracting power and a second lens element having a negative refracting power;

a second lens group having a positive refracting power, said second lens group includes, in order from the large conjugate side, a third lens element having a positive refracting power; and a third lens group having a positive refracting power, said third lens group including, in order from the large conjugate side, a fourth lens element having a negative refracting power, a fifth lens element bonded to said fourth lens element and having a positive refracting power, a sixth lens element having a positive refracting power and a seventh lens element having a positive refracting power;

wherein each of said lens elements of said first lens group has a negative refracting power.

8. The projection-type display apparatus of claim 7, wherein following conditional expressions (1) to (3) are satisfied:

$$1.3 < D_1/f < 1.8 \quad (1)$$

$$0.7 < f_2/f_3 < 1.1 \quad (2)$$

$$1.1 < |f_1|/f < 1.6 \quad (3)$$

where $D_1$ is an air gap between said first lens group and said second lens group, $f_1$ is a focal length of said first lens group, $f_2$ is a focal length of said second lens group, $f_3$ is a focal length of said third lens group, and f is a focal length of whole lens system including said first to third lens groups.

9. A projection-type display apparatus comprising:

a cabinet;

a screen supported by said cabinet;

a mirror disposed within said cabinet and at a rear of said screen; and a projector including a retrofocus lens system for projecting an image via said mirror onto said screen;

said retrofocus lens system comprising, in order from a large conjugate side:

a first lens group having a negative refracting power and including a plurality of lens elements, said first lens group including, in order from the large conjugate side, a first lens element having a negative refracting power and a second lens element having a negative refracting power;

a second lens group having a positive refracting power, said second lens group includes, in order from the large conjugate side, a third lens element having a positive refracting power; and a third lens group having a positive refracting power, said third lens group including, in order from the large conjugate side, a fourth lens element having a negative refracting power, a fifth lens element bonded to said fourth lens element and having a positive refracting power, a sixth lens element having a positive refracting power and a seventh lens element having a positive refracting power, wherein at least one surface of said first lens element is aspherical, and at least one surface of said seventh lens element is aspherical.

10. The projection-type display apparatus of claim 7, wherein said retrofocus lens system further comprises an aperture stop, disposed on a small conjugate side of said second lens group, for adjusting brightness of whole lens system.

11. The projection-type display apparatus of claim 7, wherein said retrofocus lens system further comprises a mirror, disposed between said first lens group and said second lens group, for deflecting an optical path.

12. The projection-type display apparatus of claim 11, wherein a conditional expression (5) is satisfied:

$$0° \leq \theta_1 \leq 20° \quad (5)$$

where $\theta_1$ designates an angle formed by said direction of said optical axis of light beam emitted from said retrofocus lens system and a surface of said screen.

13. The projection-type display apparatus of claim 1, wherein said retrofocus lens system further comprises a mirror, disposed between said second lens group and said third lens group, for deflecting an optical path.

14. The projection-type display apparatus of claim 13, wherein a conditional expression (5) is satisfied:

$$0° \leq \theta_1 \leq 20° \quad (5)$$

where $\theta_1$ designates an angle formed by said direction of said optical axis of light beam emitted from said retrofocus lens system and a surface of said screen.

* * * * *